United States Patent [19]

Widigen et al.

[11] Patent Number: 5,418,736
[45] Date of Patent: May 23, 1995

[54] OPTIMIZED BINARY ADDERS AND COMPARATORS FOR INPUTS HAVING DIFFERENT WIDTHS

[75] Inventors: Larry Widigen, Salinas; Elliot A. Sowadsky, Santa Clara, both of Calif.

[73] Assignee: NexGen, Inc., Milpitas, Calif.

[21] Appl. No.: 212,514

[22] Filed: Mar. 11, 1994

[51] Int. Cl.[6] .......................... G06F 7/50; G06F 7/38; G06F 7/02
[52] U.S. Cl. ................................ 364/786; 364/749; 340/146.2
[58] Field of Search ................... 364/786, 715.06, 769, 364/748, 749; 340/146.2

[56] References Cited

U.S. PATENT DOCUMENTS

| | | | |
|---|---|---|---|
| 4,203,157 | 5/1980 | Daniels et al. | 364/788 |
| 4,695,971 | 9/1987 | Reimann | 364/769 |
| 4,783,757 | 11/1988 | Krauskopf | 364/784 |
| 4,878,193 | 10/1989 | Bernstein et al. | 364/768 |
| 4,918,636 | 4/1990 | Iwata et al. | 340/146.2 X |
| 4,933,662 | 6/1990 | Szczepanek | 340/146.2 |
| 5,101,370 | 3/1992 | Kingston et al. | 364/733 |
| 5,307,375 | 4/1994 | Wu et al. | 375/16 |
| 5,319,347 | 6/1994 | McClure | 340/146.2 |

*Primary Examiner*—Tan V. Mai
*Attorney, Agent, or Firm*—W. Bennett Smith, III

[57] ABSTRACT

A first two-input adder computes the sum of one wider and one narrower input by combining a conventional adder for the low-order bits with an incrementer and selection logic for the high-order bits. A second three-input adder computes the sum of one wider and two narrower inputs in a similar way: the low-order bits are computed with a conventional carry save adder (CSA) followed by a carry propagate adder (CPA), while the high-order bits are computed with an incrementer and selection logic. The first and second circuits are combined to form a third arithmetic circuit that takes four input operands, the first of which is wider than the other three, and speculatively computes two results: (1) the sum of the first and second input operands; and (2) the sum of the first, third, and fourth input operands. This combined circuit contains all of the elements of the first two circuits, but shares a single incrementer. A degenerate case of the third circuit occurs when the second and third inputs are common. This degenerate case has particular application to superscalar instruction pointer updates for variable length instructions. By taking into account a priori restrictions on the possible input operands, these circuits are smaller and more efficient than conventional adders and comparators, which must be designed to deal with all possible input operands.

10 Claims, 15 Drawing Sheets

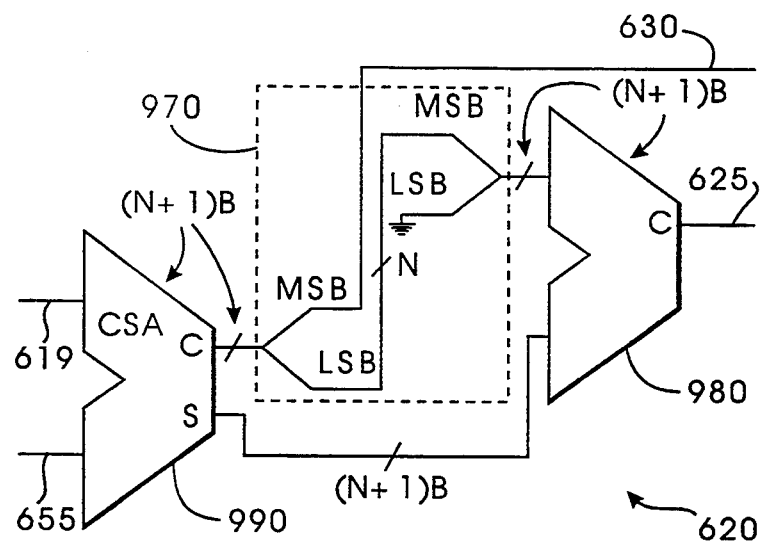
FIG. 9A
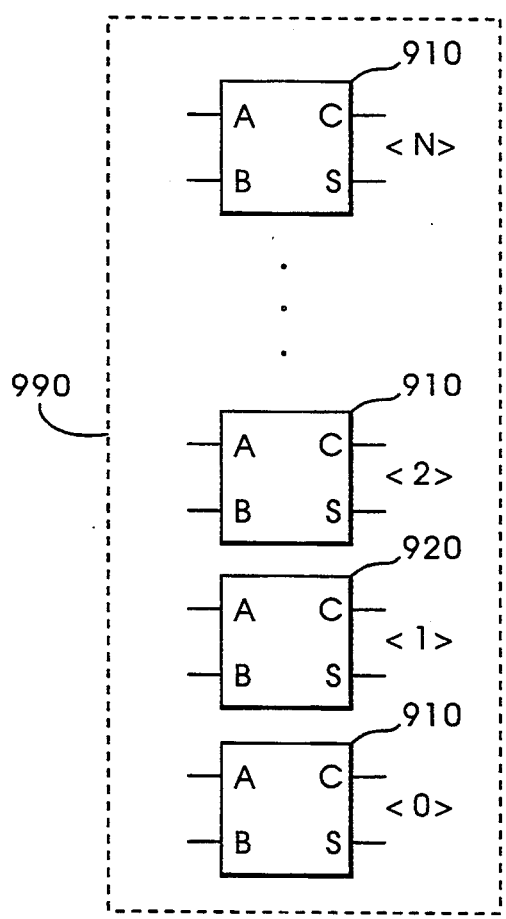
FIG. 9B
| A | B | 1 | S | C |
|---|---|---|---|---|
| 0 | 0 | 1 | 1 | 0 |
| 0 | 1 | 1 | 0 | 1 |
| 1 | 0 | 1 | 0 | 1 |
| 1 | 1 | 1 | 1 | 1 |
FIG. 9C
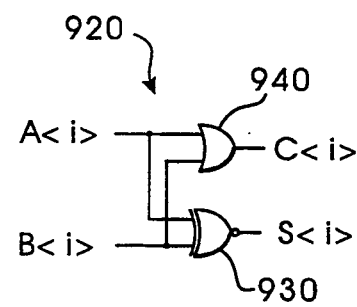
FIG. 9D

OPTIMIZED BINARY ADDERS AND COMPARATORS FOR INPUTS HAVING DIFFERENT WIDTHS

CROSS-REFERENCE TO RELATED APPLICATIONS

The present application is related to application Ser. No. 08/185488 filed Jan. 21, 1994, entitled "SUPERSCALAR EXECUTION UNIT FOR SEQUENTIAL INSTRUCTION POINTER UPDATES AND SEGMENT LIMIT CHECKS," by inventors E. A. Sowadsky, L. Widigen, D. L. Puziol, and K. S. Van Dyke (agent docket number NM. 1993.3). This application is also related to application Ser. No. 08/212,516 filed on the same date as this application, entitled "OPTIMIZED BINARY ADDER AND COMPARATOR HAVING AN IMPLICIT CONSTANT FOR AN INPUT," by L. Widigen and E. A. Sowadsky (agent docket number NM. 1993.6). All of these applications are incorporated herein by this reference and are assigned to the assignee of the present invention.

BACKGROUND

COMPUTER ARCHITECTURE

Pipeline processors decompose the execution of instructions into multiple successive stages, such as fetch, decode, and execute. Each stage of execution is designed to perform its work within the processor's basic machine cycle. Hardware is dedicated to performing the work defined by each stage. As the number of stages is increased, while keeping the work done by the instruction constant, the processor is said to be more heavily pipelined. Each instruction progresses from stage to stage, ideally with another instruction progressing in lockstep only one stage behind. Thus, there can be as many instructions in execution, as there are pipeline stages.

The major attribute of a pipelined processor is that a throughput of one instruction per cycle can be obtained, though when viewed in isolation, each instruction requires as many cycles to perform as there are pipeline stages. To obtain a throughput in excess of one instruction per cycle, multiple instructions may be issued and executed per cycle. The adjective "superscalar" is commonly applied to a non-vector processor having such attributes. Superscalar processors require a high-performance memory interface and multiple execution units.

The ability to increase throughput via pipelining is limited by situations called pipeline hazards. Hazards may be caused due to resource or data dependencies that arise due to the overlapping stages of instruction processing inherent in the pipeline technique. When a resource or data hazard occurs, the inter-stage advance of instructions must be stalled until the hazard is no longer present. Otherwise, improper operation would result. To prevent such incorrect behavior, "interlock" logic is added to detect any hazards and invoke a pipeline stall. While the pipeline is stalled, there are stages in the pipeline that are not doing any useful work. Since this absence of work propagates from stage to stage, the term pipeline bubble is also used to describe this condition. The throughput of the processor suffers whenever such bubbles occur. Hazards may also be caused due to unanticipated deviations from sequential control flow. Such control hazards are discussed infra.

Pipelining and superscalar issue and execution are viewed as architectural techniques for improving performance over what can be achieved via process or circuit design improvements. Pipelining was extensively examined in "The Architecture of Pipelined Computers," by Peter M. Kogge (McGraw-Hill, 1981). J. L. Hennessy and D. A. Patterson provide a contemporary discussion of pipelining, including superscalar approaches, in chapter 6 of "Computer Architecture, A Quantitative Approach" (Morgan Kaufmann, 1990). Recent superscalar pipelined machines include: the Intel 960 series, the Tandem Cyclone, the HP PA-RISC 7100, the IBM RSC, the Motorola 88110, the IBM RS/6000, the Cypress hyperSPARC (Pinnacle), the TI/Sun SuperSPARC (Viking), the DEC Alpha 21064, the Apple/IBM/Motorola PowerPC 601, the Intel Pentium Microprocessor, the SGI/MTI TFP, and the Apple/IBM/Motorola PowerPC 603.

Control hazards, associated with changes in control flow, were mentioned supra as limiting increased pipeline throughput. Programs may experience changes in control flow as frequently as one out of every three executed instructions. Taken branch instructions are a principal cause of changes in control flow. Taken branches include both conditional branches that are ultimately decided as taken and unconditional branches. Taken branches are not recognized as such until the later stages of the pipeline. If the change in control flow were not anticipated, there would be instructions already in the earlier pipeline stages, which due to the change in control flow, would not be the correct instructions to execute. These undesired instructions must be cleared from each stage. In keeping with the pipeline metaphor, the instructions are said to be flushed from the pipeline. Alternatively, all instruction processing following the branch could be stalled subsequent to recognizing the branch until its direction is resolved.

The instructions to be first executed where control flow resumes following a taken branch are termed the (branch) target instructions. The first of the target instructions is at the (branch) target address. If the target instructions are not introduced into the pipeline until after the taken branch is recognized as such and the target address is calculated, a pipeline bubble will result.

A variety of branch prediction techniques exist for predicting the direction of control flow associated with branches. Branch prediction is intended to reduce the occurrence of pipeline bubbles by anticipating taken branches. If a branch is predicted not-taken, the pipeline continues as usual for sequential control flow. If the branch is predicted taken, fetching is performed from the target address instead of the next sequential fetch address. By using branch prediction, many changes in control flow are anticipated, such that the target instructions of taken branches contiguously follow such branches in the pipeline. When anticipated correctly, changes in control flow due to taken branches do not cause pipeline bubbles and the associated reduction in processor throughput. Such bubbles occur, only when branches are mispredicted.

Recent works devoted to branch prediction include 1) "Branch Strategy Taxonomy and Performance Models," by Harvey G. Cragon (IEEE Computer Society Press, 1992), 2) "Branch Target Buffer Design and Optimization," by C. H. Perleberg and A. J. Smith, IEEE Transactions on Computers, Vol. 42, April 1993, pg. 396–412, and 3) "Survey of Branch Prediction Strategies," by C. O. Stjernfeldt, E. W. Czeck, and D. R.

Kaeli (Northeastern University technical report CE-TR-93-05, Jul. 28, 1993).

Conventionally, instructions fetched from the predicted direction (either taken or not-taken) of a branch are not allowed to modify the state of the machine unit the branch direction is resolved. Operations normally may only go on until time to write the results in a way that modifies the programmer visible state of the machine. If the branch is actually mispredicted, then the processor can flush the pipeline and begin anew in the correct direction, without any trace of having predicted the branch incorrectly. Further instruction issue must be suspended until the branch direction is resolved. A pipeline interlock may be required to handle this control dependency. Thus, waiting for resolution of the actual branch direction is potentially another source of pipeline bubbles.

It is possible to perform speculative out-of-order execution past predicted branches or past other instructions stalled due to resource or data dependencies. This is done by providing additional state for reverting back to an earlier version of the machine state when required. Reversion to an earlier state is required upon determination that a branch was mispredicted or due to a desire to precisely resolve the occurrence of an interrupt with respect to the instruction stream. Speculative execution beyond an unresolved branch can be done whether the branch is predicted taken or not-taken. An unresolved branch is a branch whose true taken or not-taken status has yet to be decided. Such branches are also known as outstanding branches.

Speculative execution and out-of-order execution are closely related, and the terms are sometimes used interchangeably without distinction. Nevertheless, the two concepts are distinct. Out-of-order execution is the execution (and implied completion) of an instruction stream in other than strict sequential order. Out-of-order execution is a form of "dynamic instruction scheduling" for circumventing pipeline stalls (bubbles). Speculative execution requires that the execution results be kept tentative until it is completely safe to permanently update the state of the processor. Speculative execution is always associated with either a history RAM, a "future" RAM, "relabeled" registers, or some similar arrangement. It is possible to perform carefully limited out-of-order execution that is not speculative. However, unrestricted out-of-order execution must be done speculatively, if a precise interrupt model is defined for the architecture. Out-of-order execution past unresolved branches must also be done speculatively, as improper operation would otherwise result on mispredicted branches.

Out-of-order execution is distinct from out-of-order issue, which is the issue (but not completion) of instructions in other than strict sequential order. It is possible to do in-order issue and out-of-order execution, and vice versa.

Speculative execution is also distinct from speculative issue. Speculative execution implies instruction completion and requires some means of tentatively storing the execution results. Speculative issue permits stalls related to control transfers and precise interrupts to be postponed until a latter pipeline stage than normally would be possible. As a result of the added delay, the hazard may be removed in time to avoid the stall. When a processor performs speculative issue past a branch, it may actually begin execution, but it doesn't execute to completion until after the associated predicted branch is resolved. This is because there is no means to back up the machine state should the branch be mispredicted. If the branch resolution occurs prior to the cycle in which the execution results for a speculatively issued instruction are scheduled to be written, the "execution" is no longer speculative. If the branch was correctly predicted, the result writing proceeds normally. If the branch was mispredicted, the pipeline is reset, "throwing away" the moot results. If the branch is not resolved in time, the pipeline must be stalled, because there is no means to restore the correct machine state should the branch be mispredicted. In a precise interrupt architecture, out-of-order speculatively issued instructions may be stalled from writing their results until it is determined that they may "safely" do so. That is, the results are written only when there is no possibility for an "intervening" interrupt. While many of the earlier mentioned superscalar pipelined processors perform speculative issue, it is believed that only the Motorola 88110 and the PowerPC 603 perform speculative execution to any extent.

The principles of out-of-order execution are well known in the art. As background, out-of-order execution in the IBM System/360 Model 91 was discussed in section 6.6.2 of Kogge. The January 1967 issue of the IBM Journal of Research and Development was devoted to the Model 91. More recently, the IBM Enterprise System/9000 520-based models performed speculative execution. J. L. Hennessy and D. A. Patterson provide an overview of out-of-order execution in chapter 6.

U.S. Pat. No. 5,226,126, ('126) PROCESSOR HAVING PLURALITY OF FUNCTIONAL UNITS FOR ORDERLY RETIRING OUTSTANDING OPERATIONS BASED UPON ITS ASSOCIATED TAGS, to McFarland et al., issued Jul. 6, 1993, which is assigned to the assignee of the present invention, described speculative out-of-order execution in the system in which the instant invention is used, and is hereby incorporated by reference. The detailed description that follows will presume some degree of familiarity with '126.

U.S. Pat. No. 4,858,105 ('105) PIPELINED DATA PROCESSOR CAPABLE OF DECODING AND EXECUTING PLURAL INSTRUCTIONS IN PARALLEL, to Kuriyama et al., issued Aug. 15, 1989, teaches the optional execution of two instructions in parallel, including advancement of the instruction pointer. The pointer is advanced by a first instruction length, if only one instruction is executed, or is advanced by the sum of said first instruction length and a second instruction length, if two instructions are executed. However, '105 does not teach advancement of the instruction pointer in the context of speculative execution. As a result only one value for the next instruction pointer is produced, corresponding to executing either one or both instructions.

U.S. Pat. No. 5,204,953 ('953) ONE CLOCK ADDRESS PIPELINING IN SEGMENTATION UNIT, to Dixit, issued Apr. 20, 1993, discloses pipelined single-clock address generation for segment limit checking in an architecture compatible with that of the instant invention. Updating of the instruction pointer is not disclosed. Details of the segment limit check logic are not disclosed.

COMPUTER ARITHMETIC

Gerrit A. Blaauw describes carry-save adders (CSAs) in section 2-12 of "Digital System Implementation" (Prentice-Hall, 1976). Blaauw indicates that the CSA was mentioned by Babbage in 1837, by yon Neumann in 1947, and used in 1950 in M.I.T.'s Whirlwind computer. J. L. Hennessy and D. A. Patterson discuss carry-save adders on pages A-42 and A-43.

In "A Suggestion for a Fast Multiplier" (IEEE Transactions on Electronic Computers EC-13: 14–17, 1964), C. S. Wallace, indicates that "an expedient now quite commonly used" is to add three numbers using a CSA. If a set of more than three numbers are to be added, three of the set are first added using the CSA and the carry and sum are captured. The captured carry and sum and routed back to two of the tree inputs, and another number from the set is input to the third input. (Whenever the carry-outs generated by a CSA are subsequently added in another adder, an implicit one-bit left shift of the carry-bits is implemented via the wiring between the adders.) The process is repeated until all of the numbers in the set have been added. Finally, the sum and carry are added in a "conventional" carry-propagate adder (CPA). In "Computer Arithmetic: Principles, Architecture, and Design" (John Wiley & Sons, 1979, pp. 98-100), K. Hwang describes this same technique in greater detail. In particular, see FIG. 4.2. For a dedicated three-input adder, the CSA's carry and sum need not be captured, and can instead be routed directly into the CPA.

Wallace extended the use of CSAs from adding three-inputs to adding an arbitrary number of values simultaneously, while having only a single carry-propagate path. One application of the Wallace-tree (as it came to be known) is high-performance hardware multipliers. Generally, a Wallace-tree consists of successive levels of CSAs, each level reducing the number of values being added by 3:2, since each CSA takes three inputs and produces 2 outputs. At the bottom of the tree a CPA is used to add the last carry/sum pair. Wallace taught the omission of any latches within the tree. The degenerate case of a Wallace-tree, corresponding to a dedicated three-input adder, requires only a single level of CSA prior to a CPA.

In "Introduction to Arithmetic for Digital Systems Designers" (Holt, Rineheart and Winston, 1982, pp. 103-104), S. Waser and M. J. Flynn describe a three-input adder consisting of a CSA followed by a CPA that uses a carry-look-ahead. For small bit-widths or low performance applications, a ripple-carry CPA could be substituted for the carry-look-ahead CPA.

U.S. Pat. No. 4,783,757 ('757) THREE INPUT BINARY ADDER, to Krauskopf, issued Nov. 8, 1988, teaches a carry-save adder followed by carry-propagate adder for adding three operands of 32 bits. '757 teaches the use of a full adder at a 33rd bit position (bit$<32>$) of the carry-propagate adder for generating an overall carry. (There are 33 full adders in the CPA, overall.) '757 also discloses an alternate embodiment that describes a segment limit checking "adder." This limit check adder comprises a mostly 2-input carry-save adder with least significant bit (lsb) provisions for a third input having the values 0, 1, 2, or 3. The carry-save adder is followed by a carry-chain. For 32-bit operands, the carry-save adder uses 30, two-input, circuits for bits$<31\ldots2>$ (bits 31 through 2), one three-input circuit for bit$<1>$, and no circuit for bit$<0>$. The carry-chain has 32 (for bits$<31\ldots0>$) carry-circuits corresponding to a full-adder, but the sum logic is not present. The 3-inputs (one being the carry-in) of the bit$<0>$ carry-circuit are used for the lsb of the three operands being added. An OR gate, combining the bit$<31>$carries of the carry-chain and the carry-save circuits, generates the overall carry for the segment limit checking adder.

Blaauw describes a variety of fast adder techniques in chapter 2, using APL notation. Hennessy and Patterson discuss fast adder techniques in section A.8. Fast adder techniques, including conditional-sum methods, are covered in chapter 3 of Hwang and chapter 3 of Waser and Flynn. All of these texts cover carry-look-ahead.

Conventional arithmetic circuits are designed to deal with all possible input operands. The extent to which a priori restrictions on input operands has been exploited is limited. New techniques for implementing arithmetic circuits for special classes of inputs are needed to decrease circuit size and increase efficiency.

Speculatively executing superscalar instruction pointer updates for an architecture with variable length instructions poses a unique design problem, discovered by the applicants. Speculative execution requires an ability to revert back to any previous point in the instruction execution. Rapid recovery of the processor state requires that a history of instruction pointer values be effectively maintained for each speculatively executed instruction. Superscalar execution requires that two instruction pointer values be generated and stored each cycle. Finally, variable length instructions mandate that binary adders be used, as opposed to simply incrementing the instruction pointer by a fixed amount. Multiple conventional adders can be used to solve the problem, but at substantial cost and propagation delay. New techniques are needed to produce the multiple instruction pointer results each cycle in a faster and more efficient manner than possible with multiple conventional adders.

SUMMARY

By taking into account a priori restrictions on the possible input operands, arithmetic circuits made according to the present invention are smaller and more efficient than conventional adders and comparators, which must be designed to deal with all possible input operands.

A first arithmetic circuit described in this invention computes the sum of two inputs of unequal width. Instead of using a conventional adder that is at least as wide as the widest input, a carry propagate adder (CPA) with a width equal to the narrowest input is combined with an incrementer and selection logic. This yields a circuit that is both smaller and faster than the conventional approach.

A second arithmetic circuit computes the sum of three inputs where one input is wider than the other two. As in the first circuit, the highest-order bits of the widest input are coupled to an incrementer and selection logic. The remaining bits of the first input, along with the other two inputs are connected to a carry save adder (CSA) followed by a CPA. Again, this circuit is more efficient than the conventional approach.

The first and second circuits can be combined to form a third arithmetic circuit that takes four input operands, the first of which is wider than the other three, and speculatively computes two results: (1) the sum of the first and second input operands; and (2) the sum of the first, third, and fourth input operands. This combined circuit contains all of the elements of the first two circuits, but can share a single incrementer. This third circuit is significantly smaller and more efficient than if the same function were implemented using conventional methods. A degenerate case of the third circuit occurs when the second and third inputs are common. This degenerate case answers the need for a fast and efficient approach for generating superscalar instruction pointer updates for variable length instructions in a processor performing speculative execution.

These and other features and advantages of the invention will be better understood in view of the accompanying drawings and the following detailed description. The drawings include exemplary embodiments of the present invention and illustrate various objects and features thereof. The exemplary embodiments show how these circuits can be used to perform instruction pointer updates in a high-performance microprocessor. The use of these circuits is not limited to the context of the exemplary embodiments.

BRIEF DESCRIPTION OF DRAWINGS.

FIG. 9A and 9B illustrate the internal architecture of the comparators used to perform CS Limit Checking.

FIG. 9C is a truth table for the bit<1> bit-slice of FIG. 9B.

FIG. 9D shows the logic gates corresponding to the truth table of 9C.

SCHEMATIC NOTATION

Figure 1:
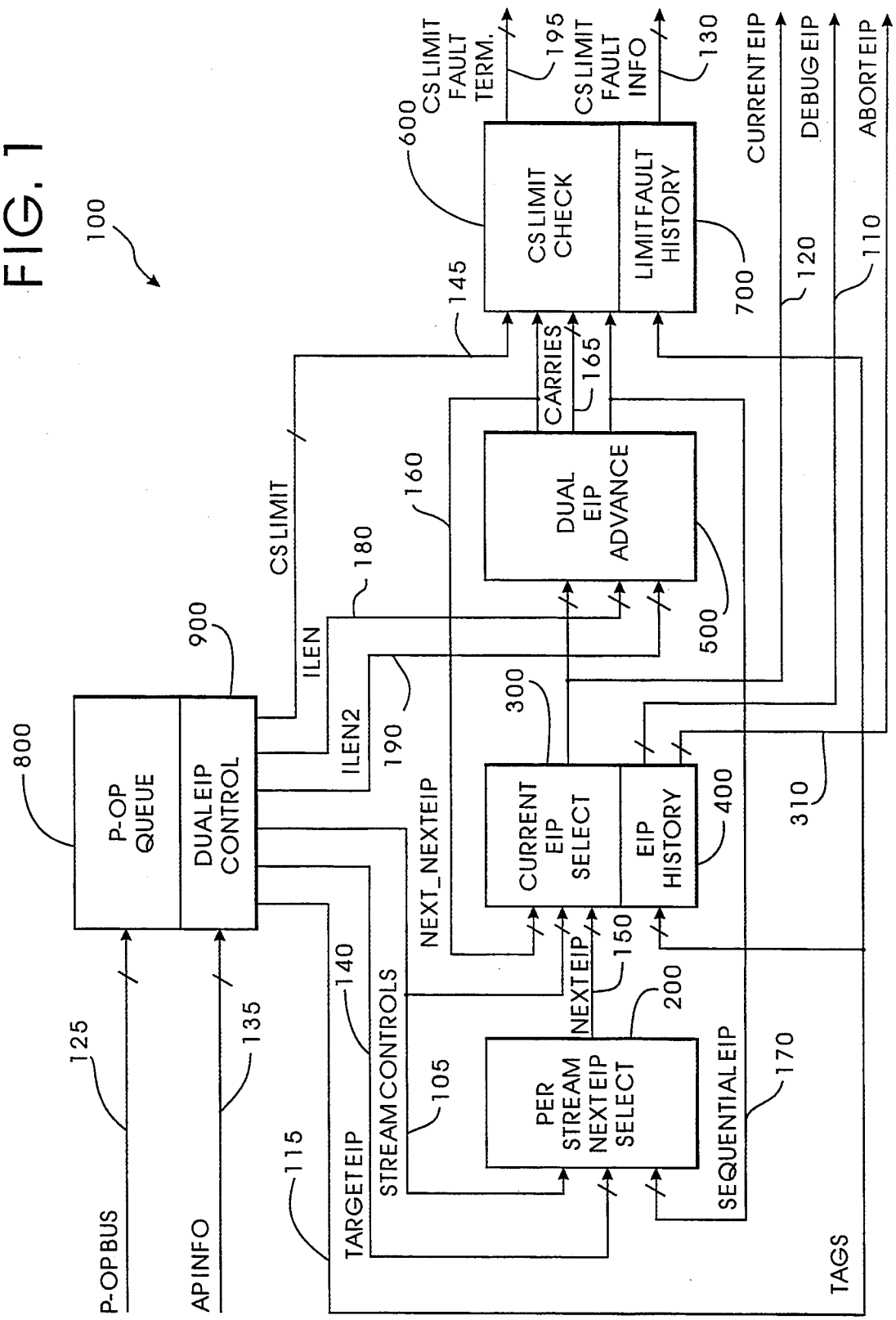
FIG. 1 is an abstract block diagram of a processor sub-system used as an exemplary embodiment of the invention.

Lines marked with a short diagonal indicate multi-bit signals. Multi-bit signals are sometimes also indicated by a bit range suffix, comprising the most significant bit number, a double-period delimiter, and the least significant bit number, all enclosed in angle brackets (e.g., <9 . . . 0>). Multi-bit wide components are sometimes indicated by a bit size consisting of a number followed by a capital B (e.g., 13B). It is implied that when a single-bit width signal, such as a clock phase or an enable, is connected to a multi-bit wide component, the single-bit width signal is fanned out to the corresponding number of bits. When merging two or more signals into one, or demerging two or more signals from one, the significance order of the individual component signals within the combined signal is explicitly shown with MSB and LSB labels adjacent to the merge or demerge.

The design uses two-phase (phase 1 and phase 2) non-overlapping clocking. Most of the logic is implemented using transparent d-type latches, which have level-sensitive clock inputs. A latch clocked by phase 1 (Ph1) is called a phase 1 latch. Similarly, a phase 2 (Ph2) latch is one clocked by phase 2. Generally speaking, a latch of a given phase should be driven by a signal that is derived from a latch of the alternate phase. This design restriction greatly reduces the effort required to avoid race conditions. To facilitate the alternate phase rule, often a signal name is given a suffix that is descriptive of the "phaseness" of the signal. E.g., WE_1 is a signal output from a phase 1 latch.

DETAILED DESCRIPTION OF THE INVENTION

SYSTEM OVERVIEW

The overall processor in which the invention operates is described to a large extent by the processor of '126, referenced supra. In summary, '126 describes a processor that has multiple function units capable of performing parallel speculative execution. The function units include a Numerics Processor unit (NP), an Integer Execution Unit (IEU), and an Address Preparation unit (AP).

A difference between the instant invention and that of '126 is that the processor is now implemented in two chips (one being the NP unit) as opposed to the eight chip implementation taught in '126. Other differences between '126 and the processor of the preferred embodiment will be noted where pertinent to making and using the present invention and carrying out the best mode.

Instructions are fetched and decoded by a DECoder unit (DEC), which generates tagged pseudo-operations (p-ops) that are broadcast to the functional units. Each instruction will result in one or more p-ops being issued. For the purpose of this invention the terms p-op and operation are used interchangeably. Each operation executed by the processor may correspond to one instruction or to one p-op of a multi-p-op instruction.

DEC "relabels" (or reassigns) the "virtual" register specifiers used by the instructions into physical register specifiers that are part of each p-op. This allows DEC to transparently manage physical register files within the execution units. Register relabeling (reassignment) is integral to the processor's ability to perform speculative execution. The p-ops could be viewed as very wide horizontal (largely unencoded) control words. The wide horizontal format is intended to greatly facilitate or eliminate any further decoding by the execution units. DEC performs branch prediction and speculatively issues p-ops past up to two unresolved branches. I.e., DEC fetches down and pre-decodes instructions for up to three instruction streams.

The AP unit contains a relabeled virtual copy of the general purpose registers and segment registers and has the hardware resources for performing segmentation and paging of virtual memory addresses. AP calculates addresses for all memory operands, control transfers (including protected-mode gates), and page crosses. AP also co-manages the processor's program counter. (The other co-manager is discussed infra.) In the architecture implemented by the processor of the instant invention, the program counter was historically referred to as the instruction pointer (IP). When the architecture was extended to 32-bits, the IP became the EIP. For the purpose of this invention, the terms EIP, instruction pointer, and program counter, are used interchangeably.

IEU also contains a relabeled virtual copy of the general purpose registers and segment registers (kept coherent with AP's copy) and has the hardware resources for performing integer arithmetic and logical operations. NP contains the floating-point register file and has the floating-point arithmetic hardware resources.

Each execution unit has its own queue into which incoming p-ops are placed pending execution. The execution units are free to execute their p-ops largely independent of the other execution units. Consequently, p-ops may be executed out-of-order. When a unit completes executing a p-op it sends terminations back to DEC. DEC evaluates the terminations, choosing to retire or abort the outstanding p-ops as appropriate, and subsequently commands the function units accordingly. Multiple p-ops may be retired or aborted simultaneously. A p-op may be aborted because it was downstream of a predicted branch that was ultimately resolved as being mispredicted, or because it was after a p-op that terminated abnormally, requiring intervening interrupt processing.

Aborts cause the processor state to revert to that associated with some previously executed operation. Aborts are largely transparent to the execution units, as most processor state reversion is managed through the dynamic register relabeling specified by DEC in subsequently issued p-ops.

DUAL EIP UNIT OVERVIEW

The Dual EIP Unit (DEU) is an additional dedicated special purpose execution unit (EU) beyond that taught in '126. DEU assumes AP's former role of computing the value of the instruction pointer for sequential instruction execution. Sequential instruction execution includes non-control-transfer operations and predicted not-taken control transfer operations. DEU is required for non-sequential instruction execution as well. Non-sequential instruction execution is associated with predicted taken control transfer operations. (The predicted taken operation, per se, lies within the existing sequential instruction stream. However, the target operation of the predicted taken operation lies within a new sequential instruction stream.) DEU executes predicted taken control transfers in order to provide the EIP for the instruction associated with the control transfer operation to AP. AP uses the EIP to calculate the target address of the control transfer and checks that the target address lies within the code segment. DEU must receive the target address from AP prior to executing any operations in the target instruction stream. Details for predicted taken control transfers are discussed further, infra. DEU also must perform limit checking to insure that all instruction bytes of each control transfer (predicted taken or not) lie within the code segment. Thus, the functional unit nominally performing sequential instruction pointer updates (formerly AP, presently DEU) is implicitly required for execution of all p-ops.

In the present invention, it is DEU, and not AP, as taught in '126, that is the only functional unit that nominally executes all p-ops. Since AP continues to calculate the target instruction address for control transfers, it is closely associated with DEU.

DEU has a p-op queue from which it reads up to two p-ops in a clock, it computes separate sequential EIP values for all p-ops processed, and performs limit checks on the computed sequential EIP values. The AP Unit no longer routinely performs these functions. However, AP will jointly perform these functions with DEU under special circumstances, described infra. As mentioned supra, DEU will execute all p-ops issued. It will terminate each p-op or each two p-ops as it executes them. DEU is the only execution unit that is required to always execute each p-op issued by DEC. AP continues to calculate non-sequential EIP values, data operand Effective Address (EA) calculations, and segment limit checks on all address values calculated within AP. When DEU and AP both execute the same p-op, DEC must prioritize the CS limit faults from DEU with those faults detected by AP. Although DEU is capable of superscalar execution of two p-ops per cycle, the DEC unit used in conjunction with the current embodiment does not support superscalar issue. As a result, the average overall performance of the processor is necessarily less than one instruction per cycle. Future embodiments will preferably use a DEC capable of issuing multiple p-ops per cycle.

At a small incremental cost, DEU enables better use of the expensive limited resources of AP. The DEU logic represents the addition of relatively modest hardware resources compared to the register file, linear/EA adder, and paging unit of AP. DEU unburdens AP from the task of managing the sequential instruction pointer. Previously, the sequential EIP update used little of the expensive hardware resources of AP, yet consumed valuable pipeline slots. These slots represented lost opportunity to execute tasks that make more demanding use of AP's facilities. Such "demanding" tasks include memory reference operations, control transfers, and page crosses. Because AP no longer nominally processes p-ops requiring only a sequential EIP update, it can proceed directly to later operations in the instruction stream that include the demanding tasks just mentioned. The presence of DEU thus removes resource dependencies and thereby increases the available instruction level parallelism. The increased instruction level parallelism is readily exploited by the processors ability to perform out-of-order and speculative execution, and performance is enhanced as a result.

DEU AND AP SYNCHRONIZATION

When a predicted taken transfer of control p-op is encountered, DEU synchronizes its execution of the p-op with that of AP. DEU will not try to process another p-op in the same cycle as a predicted taken control-transfer p-op. If AP is not ready to execute the p-op, DEU stalls. Similarly, if DEU is not ready to execute the transfer of control p-op being processed by AP, then AP stalls. When both DEU and AP are ready, DEU executes the predicted taken control transfer to provide the current EIP to AP. The current EIP will point to the first byte of the instruction associated with the predicted taken control transfer operation. AP performs the actual Target EIP calculation since only it has the required address components, EA adder, and segment information. AP also performs a segment limit check for the Target EIP value. For generating a return address for use on the system stack, AP will add the instruction length of the predicted taken control transfer to the current EIP it receives from DEU. For calculating the target address for a program counter relative jump, AP will add the instruction length of the predicted taken control transfer, the current EIP it receives from DEU, and other address components as required by the architectural definition of the control transfer instruction. However it generates the target instruction address, AP will subsequently transfer it to DEU. DEU must receive the target address from AP prior to executing any operations in the target stream. The target address will subsequently become the current EIP when the first operation in the target stream is executed.

If a control transfer instruction is decomposed into more than one p-op, both AP and DEU execute the multiple p-ops in a synchronized fashion. Following the release by AP of the last p-op of a transfer control instruction, DEU stops synchronizing its execution with AP until it encounters another transfer control p-op.

Under normal operation, the Dual EIP Unit receives every p-op, while AP receives only those p-ops which require Target EIP calculation, data operand EA calculations, segment register access, or other AP controlled resource. If breakpoints are enabled however, AP will also receive every p-op.

DEU ORGANIZATION

FIG. 1 is an abstract overview of the Dual EIP Unit (DEU) 100. The major functional blocks of DEU comprise the Dual EIP Control 900, P-Op Queue 800, Unit Fault History 700, CS Limit Check 600, Dual EIP Advance 500, EIP History 400, Current EIP Select 300, and Per Stream Next EIP Select 200. DEU receives miscellaneous information via AP Info 135, including CS Limit 145 and Target EIP 140.

P-Op Queue 800 holds p-ops issued by the DEC unit. The p-ops provide a variety of data, including tags, instruction lengths, and stream control related information. Dual EIP Control 900 responds to the enqueued p-ops, receives information from the AP unit, and generates controls signals to the other functional blocks. Dual EIP Control 900 will permit a single operation to be executed when only one p-op is available for processing, or when the p-op is for a predicted taken control transfer type instruction. Control transfers include calls, returns, jumps (branches), conditional jumps, and page crosses. Two operations are executed simultaneously when two p-ops are "available" and neither of them is a predicted taken control transfer. To be available, a p-op must have been issued by DEC and be held in P-Op Queue 800 ready for execution by the DEU. If no p-ops are held in P-Op Queue 800 at the end of a cycle, no operations can be executed in the following cycle. A cycle in which no operations are executed is called a null-cycle. A null-cycle can be the result of an empty P-Op Queue or because the DEU is stalled by AP during synchronized execution.

Based on Stream Controls 105, block 200 maintains Next EIP values for the three instruction streams that the processor is tracking. For sequential control flow, the Next EIP of the currently active stream is updated from the sequential EIP 170 value calculated by the Dual EIP Advance block 500. For changes in control flow, the Next EIP of the newly active stream takes on the Target EIP 140 value provided by AP. The Next EIP values are updated in Ph1. The Per Stream Next EIP Select 200 also selects which stream's Next EIP value to submit to the Current EIP Select 300.

Current EIP 120 is provided by Current EIP Select 300. Current EIP Select 300 recirculates the previous cycle's value of Current EIP 120 or selects from the Next EIP 150 provided by the Per Stream Next EIP Select 200, NEXT_NEXTEIP 160 calculated by Dual EIP Advance 500, or a previous value of EIP kept in EIP History 400. Block 300 performs this selection also based on Stream Controls 105. Current EIP 120 is used internally within DEU and is also provided to AP. Current EIP 120 is updated in Ph2 of non-null cycles to point to the first byte of the instruction associated with the first (and possibly only) operation that is executed in each said non-null cycle. This definition for Current EIP 120 is important to understanding the invention.

Target EIP 140, via Next EIP 150, will become the Current EIP 120 in non-null cycles with changes in control flow. For non-abort sequential execution cycles, Next EIP 150 will become the Current EIP 120, if only one operation was executed in the previous (most recent) non-null cycle. For non-abort sequential execution cycles, NEXT_NEXTEIP 160 will become the Current EIP 120, if two operations were executed in the previous non-null cycle. Several important signals are a function of Current EIP 120. When Current EIP 120 changes due to execution of an operation, these dependent signals will subsequently change as a result. It also follows, that these dependent signals will not change while Current EIP 120 is recirculated during null-cycles.

EIP History 400 provides previous EIP values to Current EIP Select 300 and to AP. When EIP History 400 provides a previous EIP value, Tags 115 are used to address the value from within a history RAM. Debug EIP 110 is used by AP when debugging is enabled. Abort EIP 310 is used by AP in conjunction with maintaining the NP environment.

Dual EIP Advance 500 adds ILEN 180, and ILEN2 190, to Current EIP 120. Block 500 generates the Sequential EIP 170, NEXT_NEXTEIP 160, and carries 165 used to detect that the EIP advance exceeded the EIP's $2^N$ maximum value. (N=32 in the illustrated embodiment.) Sequential EIP 170 points to the first byte of the instruction after the instruction associated with the first operation executed in the previous non-null cycle. It is equal to Current EIP 120 plus ILEN 180. NEXT_NEXTEIP 160 is an EIP that becomes valid in the Ph1 following a cycle in which two operations were executed. NEXT_NEXTEIP remains valid until the Phi following a cycle in which only one operation is executed. When valid, it is equal to Current EIP 120 plus ILEN 180 plus 1LEN2 190. If both operations executed were associated with single p-op instructions and therefore had non-zero ilen, NEXT_NEXTEIP points to the second sequential instruction after the instruction identified by Current EIP 120. I.e., it points to the instruction after the instruction associated with the second operation executed. This is a special case, given that either or both of ILEN and ILEN2 may be zero, as discussed infra.

ILEN 180 and ILEN2 190 are updated in Ph2 of non-null cycles with the instruction lengths associated with the operations being executed. In null-cycles, ILEN 180 and ILEN2 190 do not change from their previous values. ILEN 180 corresponds to the ilen field (instruction length) of the first (and possibly only) p-op being executed. ILEN2 190 corresponds to the ilen of any second operation that is executed. ILEN2 190 is undefined if only one operation is being executed. For multi-p-op instructions, only the first p-op has a non-zero ilen field. ILEN 180 or ILEN2 190 is zero whenever its associated operation corresponds to a latter p-op in a multi-p-op instruction. (ILEN and ILEN2 simultaneously may be zero.)

In a given cycle, one or two operations may be executed that correspond to the latter (zero ilen) p-ops in a multi-p-op instruction. For this reason, phrases similar to "the instruction associated with the first operation executed" appear throughout this detailed description. For the special case when said first operation corresponds directly to a single-p-op instruction, the above phrase is equivalent to "the first instruction executed."

CS Limit Check 600 compares the EIP results with the CS Limit 145 provided by AP and evaluates the comparison in view of the carries 165. CS Limit Fault Terminations 195 are generated as a result of the evaluation and provided to DEC. Limit fault information is also stored in the Limit Fault History 700. CS Limit Fault Info 130 may be read from the Limit Fault History 700, addressed using Tags 115, and provided to AP.

To simplify FIG. 1, some of the signals mentioned supra represent classes of signals that will be examined in more detail infra. Specifically, Tags 115, Stream Controls 105, CS Limit Fault Terminations 195, and Carries 165, comprise signals that will appear in later drawings with their own reference designators. Cross-reference between the signals of FIG. 1 and their component signals will be made as the components are introduced. Additional signals, of secondary importance and not shown in FIG. 1, will also be discussed in conjunction with the other drawings.

NEXT EIP SELECT

Figure 2:
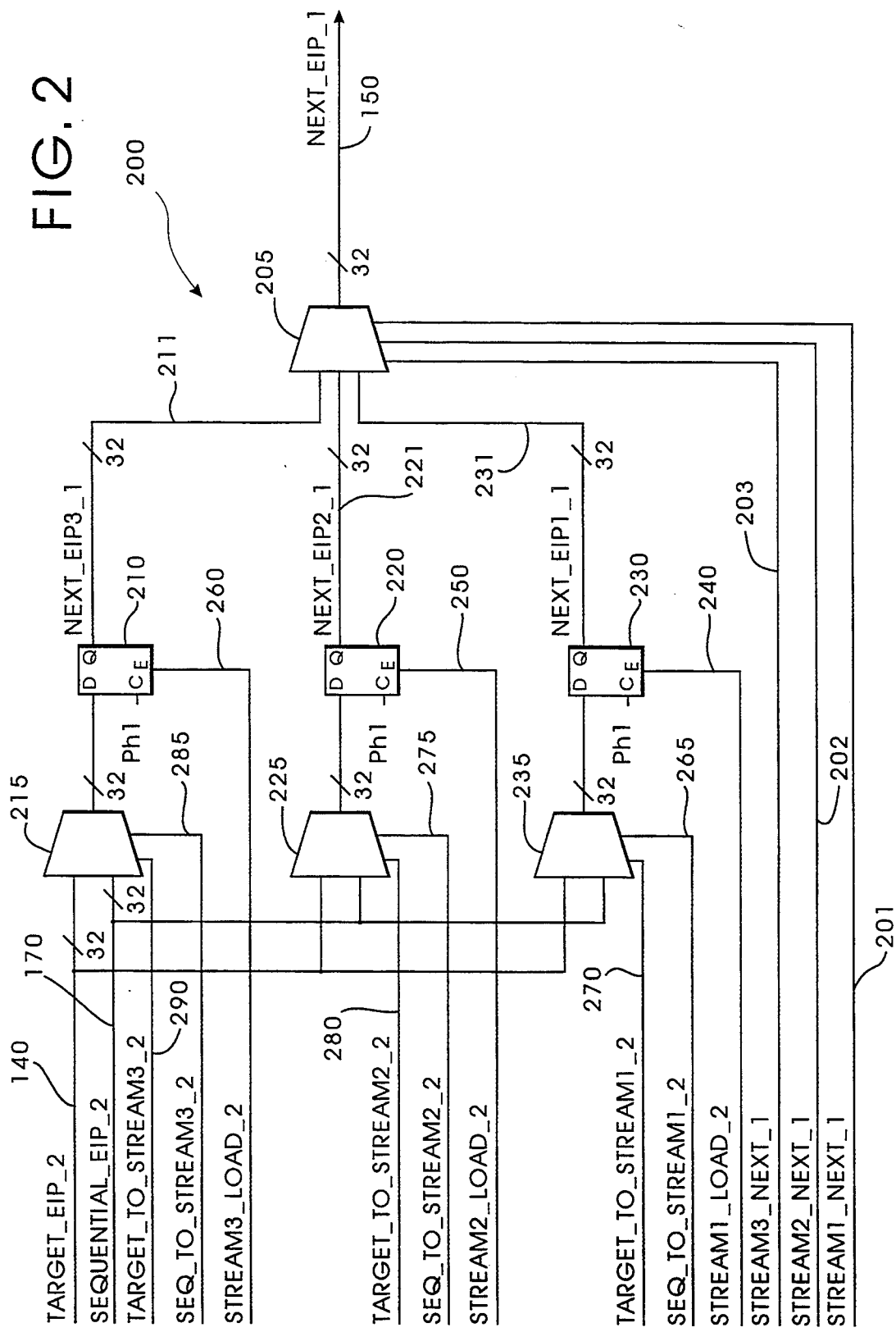
FIG. 2 is a detailed schematic of the Next EIP Selection Logic.

FIG. 2 illustrates the Next EIP Selection Logic 200. NEXTEIP 150 is selected from 1 of 3 stream latches 230 (first stream), 220 (second stream), or 210 (third stream), using mux 205. Activating unencoded mux control STREAM1_NEXT_1 201, STREAM2_NEXT_1 202, or STREAM3_NEXT_1 203, selects NEXT_EIP1_1 231, NEXT_EIP2_1 221, or NEXT_EIP3_1 211, respectively, corresponding to the first, second, or third streams. The stream selected by mux 205 corresponds to the currently active stream, and the mux controls are changed only when the stream that is currently active changes. This occurs when there is a change in control flow or because a predicted branch was ultimately resolved as being mispredicted.

Each stream latch can be loaded from either the SEQUENTIAL_EIP 170 value or from the TARGET_EIP 140. TARGET_EIP 140 is the target location computed by AP for a transfer of control instruction. Muxes 235, 225, and 215 select the values to be loaded into the respective stream latches 230, 220, and 210. Unencoded mux control pairs SEQ_TO_STREAM1_2 265 and TARGET_TO_STREAM1_2 270, SEQ_TO_STREAM2_2 275 and TARGET_TO_STREAM2_2 280, and SEQ_TO_STREAM3'285 and TARGET_TO_STREAM3_2 290, select the sequential or target EIP value, respectively, for each of the three streams. As long as a stream remains active, SEQUENTIAL_EIP 170 will be selected as the source for the stream latch. Further, if a sequential operation is executed in a given cycle, then SEQUENTIAL_EIP 170 will be selected as the source for the next Ph 1 update of the associated stream's latch. It is possible for one stream latch to be updated to reflect the execution of a sequential operation in the previous cycle, while another stream latch is receiving the TARGET_EIP associated with a change in control flow.

Enables STREAM1_LOAD_2 240, STREAM2_LOAD_2 250, and STREAM3_LOAD_2 260, load the respective stream latches 230, 220, and 210. As long as a stream remains active, its stream latch's enable will be active. Further, if an operation is executed in a given cycle, then it's associated stream will have its latch updated in the following Ph1. When there is a change in control flow, the enable for the new currently active stream will become active in time to receive the TARGET_EIP.

All of the mentioned mux and latch controls are derived from Stream ID (SID) information provided by the Decoder Unit (DEC) in the p-ops. These stream control signals are a function of the speculative operation issue by DEC. In the present embodiment, the stream control derivation is largely performed in AP and passed to the DEU via AP Controls 135.

CURRENT EIP SELECT

Figure 3:
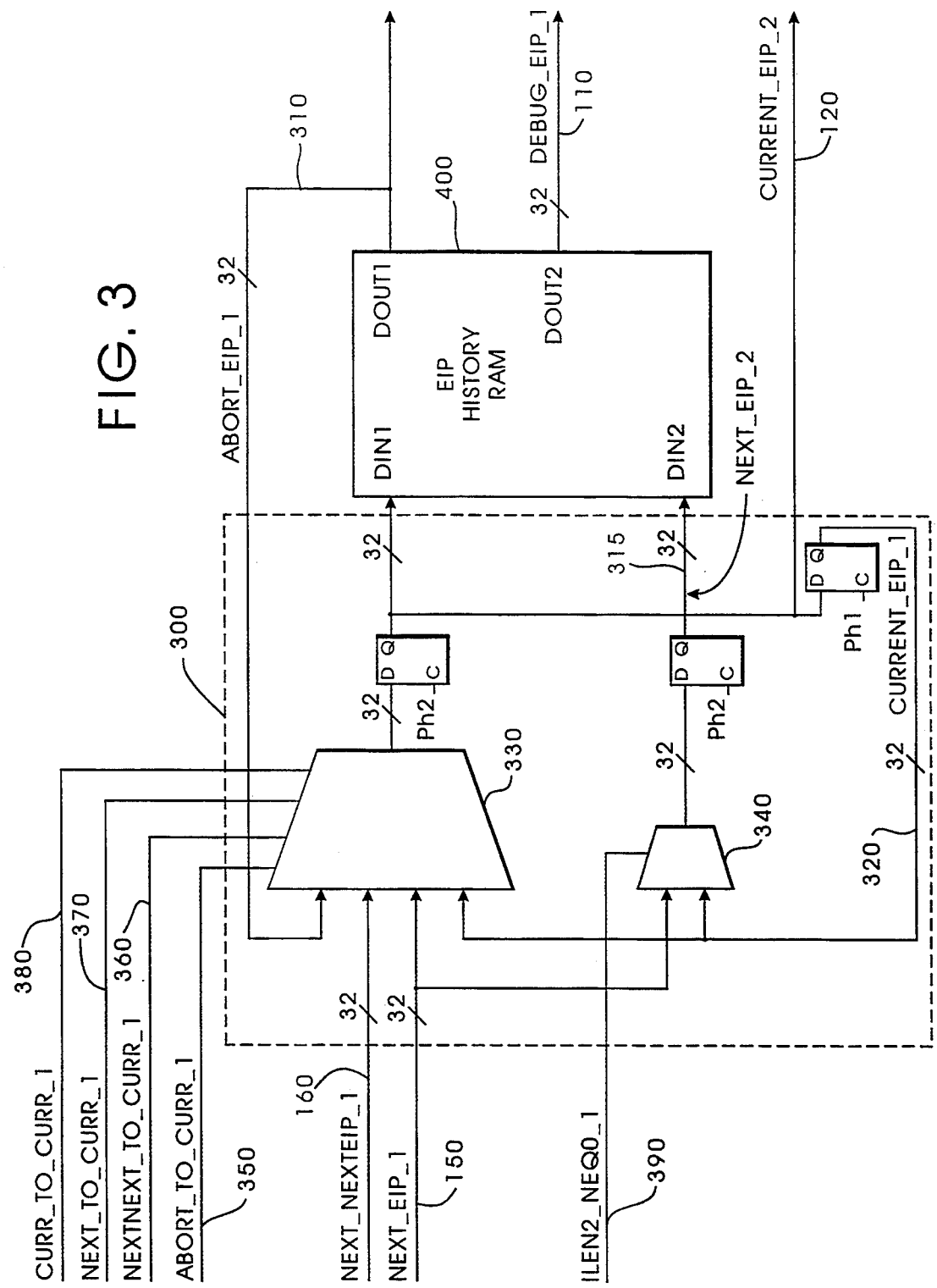
FIG. 3 shows the Current EIP Selection Logic and its relationship with the EIP History RAM.

FIG. 3 shows the Current EIP Select Logic 300 told a simplified version of the EIP History RAM 400. The CURRENT_EIP_2 120 is provided to the Dual EIP Advance Logic 500 as well as the AP Unit. The AP uses the Current EIP as a starting value for computing relative branches, for calls where EIP must be pushed onto the memory stack, and other purposes. The Current EIP value is selected by multiplexer 330 from 1 of 4 sources:

(1) the previous EIP value (CURRENT_EIP_1 320) during null-cycles, or when ILEN 180 is equal to zero;
(2) the ABORT_EIP 310 value read from the EIP History Ram 400 when the processor is aborting (reverting) back to an older operation;
(3) the NEXT_EIP 150 when one or two operations are being executed and only one operation was processed in the most recent non-null cycle; and
(4) the NEXT_NEXTEIP 160 when one or two operations are being executed and two operations were executed in parallel in the most recent non-null cycle.

The mux selects 350, 360, 370, and 380 for multiplexer 330 are unencoded and are components of Stream Controls 105 of FIG. 1. The previous cycle's Current EIP is recirculated by selecting CURRENT_EIP_1 320 using mux control CURR_TO_CURR_1 380. This is done for null-cycles when there is no abort. Thus, CURRENT_EIP_2 does not change in non-abort null-cycles. ABORT_EIP_1 310 is selected using mux control ABORT_TO_CURR_1 350, when an abort occurs and DEU has already processed the p-op. NEXT_EIP 150 is selected using mux control NEXT_TO_CURR_370 in a non-null cycle when only one operation was processed in the previous non-null cycle. NEXT_NEXTEIP 160 is selected using mux control NEXTNEXT_TO_CURR_1 360 in a non-null cycle when two operations were processed in the previous non-null cycle. NEXT_NEXTEIP 160 is the sequential EIP value formed by adding two instruction lengths to the current EIP value. It is only valid when two operations were processed in the previous non-null cycle.

Multiplexer 340 selects the value loaded into the NEXT_EIP_2 315 latch. Encoded mux control ILEN2_NEQ0_390 (ILEN2 is not equal to zero) selects NEXT_EIP_1 150 when active, and CURRENT_EIP_1 320 otherwise. ILEN2_NEQ0_1 390 is generated by Dual EIP Control 900. ILEN2_NEQ0_1 is updated every Ph1 in accordance with the value of ILEN2 from the previous cycle. If ILEN2 is zero, NEXT_EIP_2 will contain the value of CURRENT_EIP_2 from the previous cycle. If ILEN2 is non-zero, NEXT_EIP_2 will contain the NEXT_EIP_1 value. These choices are best understood in conjunction with the write timing for port DIN2 of the EIP History RAM 400, discussed infra.

The EIP History RAM 400 has 2 write ports, DIN1 and DIN2, for storing the CURRENT_EIP_2 120 and the NEXT_EIP_2 315, respectively. The RAM saves the EIP value for each operation executed at an address location specified by the tag of the operation. CURRENT_EIP_2 120 is written using port DIN1 in the Ph1 following all non-null cycles. (The cycle in which CURRENT_EIP_2 is written can be null or non-null.) It is written at the tag address of the first (and possibly only) operation that was executed. If two operations are executed in a first (non-null) cycle, NEXT_EIP_2 will be written using port DIN2 in the Ph1 on the following cycle. (The write to port DIN2 does not wait for a non-null cycle, it is always done one cycle after the write to DN1. The cycle in which NEXT_EIP_2 is written can be null or non-null.) The NEXT_EIP_2 value will be written at an address that is one less (modulo 16) than the tag address of the first (and possibly only) operation that is executed in the second non-null cycle.

Each operation executed has an EIP value written at the address given by the operation's tag value. This is true even for the latter p-ops of multi-p-op instructions. Because these latter p-ops have zero ilen, all p-ops for a multi-p-op instruction will have identical stored EIP values.

The RAM also has 2 read ports. When an abort back to an older tag occurs, the DOUT1 read port is used to provide a saved EIP value (ABORT_EIP_1 310) for the operation that is aborted to. The DOUT1 read port is also read by AP in conjunction with maintaining the NP environment. The DOUT2 read port is used by AP when breakpoints are enabled. A computed EIP value for an operation (DEBUG_EIP_1 110) is read as a prerequisite to computing the linear EIP.

PAIRING OF EACH EIP WITH ITS ASSOCIATED TAG

The EIP of the next operation (the next EIP) is available before the next operation and its tag address are received. This is because the next EIP is calculated from the EIP and ilen of the current (just executed) operation. The preceding presumes execution of a single operation. If two operations are simultaneously executed, then the ilen of both operations is also available. In this case, a "next-next" EIP (the EIP of the operation following the two operations executed) can be calculated from both ilens and the EIP of the first of the two operations (defined to be the current EIP). Note that an operation's execution, and hence its tag availability, naturally lags behind the availability of its EIP. Since EIP values are written into the EIP History RAM at the address specified by their associated tag, the tag availability must be accounted for in the RAM's write timing.

In light of the lag between an operation's EIP availability and its execution, consider the following parallel development of NEXT_EIP_1 150 and NEXT_NEXTEIP_1 160. NEXT_NEXTEIP_1 and NEXT_EIP_1 are latched in Ph1 following a first non-null cycle in which a first and second operation are executed. NEXT_EIP_1 is derived from SEQUENTIAL_EIP_2 170, which is given by CURRENT_EIP2 (of said first non-null cycle) plus the ilen of said first operation. NEXT_NEXTEIP_1 is derived from SEQUENTIAL_NEXTEIP_2 (discussed infra), which is equal to CURRENT_EIP_2 (of said first non-null cycle) plus the ilen of said first operation plus the ilen of said second operation. (CURRENT_EIP_2, of said first non-null cycle, is written into the EIP History RAM port DIN1 in the Ph1 following the first non-null cycle. If two operations had been executed in a non-null cycle previous to said first non-null cycle, port DIN2 would also be written at the same time as DIN1.) In a second non-null cycle in which a third and possibly fourth operation are executed, NEXT_NEXTEIP_1 will become the new CURRENT_EIP_2 and NEXT_EIP_1 will become the new NEXT_EIP_2. These values will then be written simultaneously into EIP History RAM ports DIN1 and DIN2, respectively, in the Ph1 following the second non-null cycle. The pairing of tag addresses with EIPs for this development is as follows. CURRENT_EIP_2 of said first non-null cycle is the EIP associated with the tag of said first operation. NEXT_EIP_2 of said second non-null cycle is the EIP associated with the tag of said second operation. CURRENT_EIP_2 (formerly NEXT_NEXTEIP_1) of said second non-null cycle is the EIP associated with the tag of said third operation.

EIP HISTORY RAM

Figure 4:
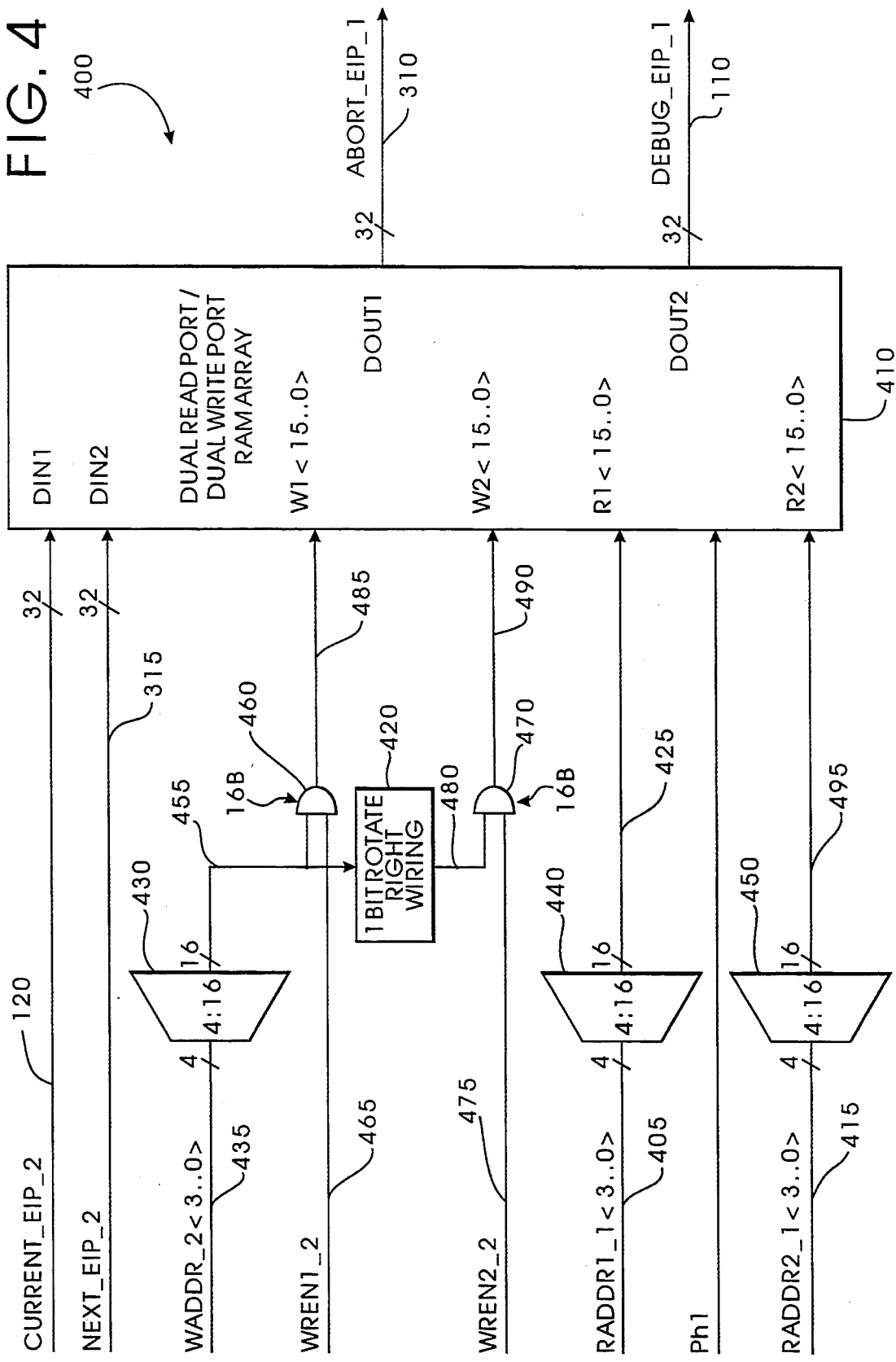
FIG. 4 illustrates internal control details of the EIP History RAM.

FIG. 4 shows the EIP History RAM 400 internals, including the RAM array 410 and controls not shown in FIG. 3. All of the 4-bit address tags 435, 405, and 415, are components of Tags 115 of FIG. 1. They are decoded using 4-to-16 decoders 430, 440, and 450, respectively. Data input 120 via DIN1 is written to the address specified by WADDR_2<3 . . . 0>435, when WREN1_2 465 is asserted. Decoder 430 generates the 1-out-of-16 write-port-1 address 455. Data input 315 via D1N2 can be simultaneously written to the location corresponding to the preceding sequential address when WREN2_2 475 is asserted. The preceding sequential address 480 is generated by a one bit right rotate of the 1-out-of-16 port 1 address using a 1-bit wiring transposition within block 420. Address 480 is thus one less, modulo 16, than address 455. Gate 460 drives write enables 485 for write port 1. Gate 470 drives the write enables 490 for write port 2. The RAM array 410 is clocked using phase 1 (Ph1). WREN1_2 465 and WREN2_2 475 are generated by Dual EIP Control 900.

Data can be simultaneously output from two read ports, independent of write operations. ABORT_EIP_1 310 is read from port DOUT1, from the location specified by RADDR1_1<3 . . . 0>405. Decoder 440 generates the 1-out-of-16 read-port-1 address R1<1 5 . . . 0>425. DEBUG_EIP_1 110 is read from port DOUT2, from the location specified by RADDR2_1<3..0>415. Decoder 450 generates the 1-out-of-16 read-port-1 address R2<15 . . . 0>495.

DUAL EIP ADVANCE

Figure 5:
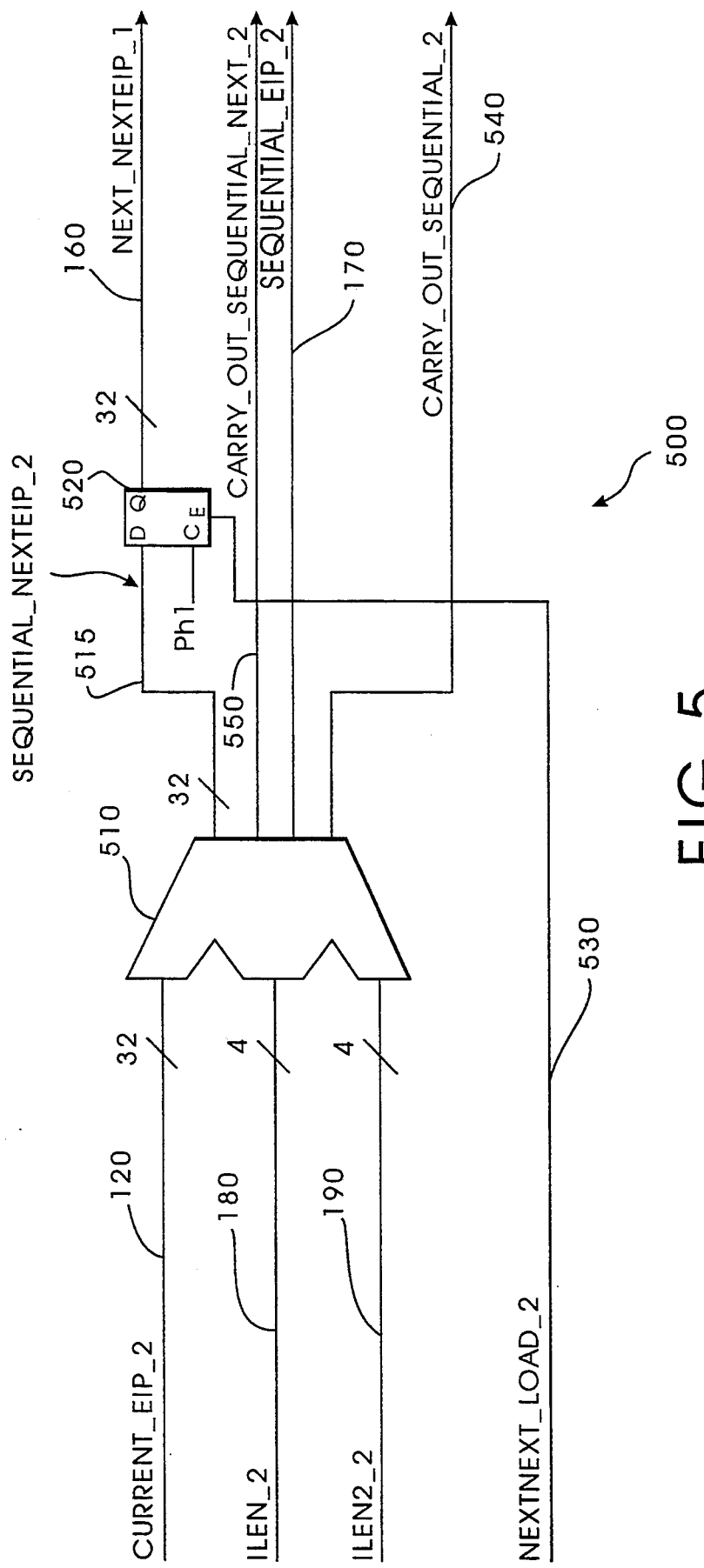
FIG. 5 is a high-level schematic of the adder that performs the Dual EIP Advance.

FIG. 5 details the Dual EIP Advance Block 500. Dual EIP Adder 510 takes as input the 32-bit CURRENT_EIP 120 value, the instruction length ILEN 180 for a first operation, and the instruction length ILEN2 190 for a second operation. The various circumstances under which the two instruction length may be zero or non-zero were discussed, supra. Instructions in the architecture implemented are of variable length, being from one to fifteen bytes. Generally, the values ILEN and ILEN2 are not equal to each other. Each value also generally varies from cycle to cycle. The Dual EIP Adder 510 computes the SEQUENTIAL_EIP 170, which is the sum of the CURRENT_EIP plus ILEN, as well as SEQUENTIAL_NEXTEIP 515, which is the sum of the CURRENT_EIP plus ILEN plus ILEN2. SEQUENTIAL_NEXTEIP is input to latch 520, which is enabled by NEXTNEXT_LOAD 530. NEXTNEXT_LOAD 530 is generated by Dual EIP Control 900, NEXT_NEXTEIP 160 is the output of latch 520. As discussed supra, NEXTNEXT_LOAD 530 is only enabled and NEXT_NEXTEIP 160 is only considered valid following the execution of two operations. SEQUENTIAL_EIP is an input to the Next EIP Select Logic 200. NEXT_NEXTEIP is an input to the Current EIP Select Logic 300. The adder also generates CARRY_OUT_SEQUENTIAL 540 and CARRY_OUT_SEQUENTIAL_NEXT 550, the carry out signals for the SEQUENTIAL_EIP and NEXT_NEXTEIP, respectively. These carry out signals are components of Carries 165 of FIG. 1 and are input to the CS Limit Check 600.

CS LIMIT CHECK THEORETICAL DEVELOPMENT

As part of the housekeeping performed by every instruction (including control transfers), the instruction pointer is tentatively sequentially advanced by the length of the instruction. As a result of the EIP advance, the SEQUENTIAL_EIP (if one operation was most recently executed, or the SEQUENTIAL_NEXTEIP, if two operations were most recently executed) points to the first byte of the instruction beyond the instruction(s) associated with the operation(s) most recently executed. In the segmented architecture of the present invention, each instruction being executed must lie completely within the bounds of the code segment (CS) as specified by the CS limit. Otherwise, a limit fault must be signaled. The CS Limit Check Logic 600 confirms that the last byte of the instruction associated with each operation executed is within the limit, or generates a limit fault indication. In the context of the present invention, the EIP advance and any resulting limit faults are initially tentative, given that the operations are executed speculatively.

To avoid generating a limit fault, it is required that the following equation be satisfied:

$$\text{CS Limit} \geq \text{SEQUENTIAL\_EIP} - 1.$$

As mentioned supra, the sequential EIP advance causes the EIP to point one byte beyond the instruction associated with the operation being executed. Therefore, the "1" must be subtracted from the updated EIP value (SEQUENTIAL_EIP) for purposes of evaluating the operation executed. The limit fault equation can be manipulated to:

$$\text{CS Limit} - \text{SEQUENTIAL\_EIP} + 1 \geq 0.$$

The term "-SEQUENTIAL_EIP" is then replaced with it's two's complement, !SEQUENTIAL_EIP+1 (where "!" indicates complementation), and the equation manipulated to its final form:

$$\text{CS Limit} + !\text{SEQUENTIAL\_EIP} + 2 \geq 0.$$

The inequality is evaluated by observing whether the binary addition of the three components results in a carry. A lack of a carry is equivalent to a borrow, indicating that the result is less than zero, and hence that at least part of the instruction associated with the operation executed is beyond the specified limit.

It follows that if two operations were most recently executed, the instruction associated with the second operation executed may be evaluated using:

$$\text{CS Limit} + !\text{SEQUENTIAL\_NEXTEIP} + 2 \geq 0.$$

When two operations are executed in parallel, both of the last two inequalities are likewise evaluated in parallel.

The result of the EIP advance is modulo $2^{32}$. The preceding tests presume that the operation did not advance the EIP beyond the (4-GB -1) maximum value of the 32-bit EIP register. Since the maximum limit value is also 4-GB-1, all EIP advances that "wrap around" this maximum value, save one, necessarily result in limit faults. A wrap is indicated by either of carry-outs 540 or 550 of the most significant bit of either sum of the Dual EIP adder 510. Each of these carry-outs is thus referred to as a "wrap-carry".

The one wrap-carry case that does not correspond to a limit fault, is when the limit is at the maximum and the last byte of the instruction, associated with the executed operation, is at the limit. In this case, SEQUENTIAL_EIP is equal to zero. As a result, !SEQUENTIAL_EIP is all ones, or $2^{32}-1$. The CS Limit is also all ones, or $2^{32}-1$, since it is also at the maximum value. In a common two-input adder, the maximum sum is $2^{32}-1+2^{32}-1$, or $2^{33}-2$. In this situation there is at most one carry out of the most significant bit ($2^{31}$) of the addition. In contrast, the addition for the CS limit check requires a virtual third adder input. This third input is equal to 2 and the sum of all three values is $2^{32}-1+2^{32}-1+2$, or $2^{33}$. This situation conceptual corresponds to a "double-carry" out of the most significant bit ($2^{31}$) of the addition. The wrap-carry case that does not correspond to a limit fault can thus be distinguished by looking for the generation of the double-carry.

CS LIMIT CHECK STRUCTURE

Figure 6:
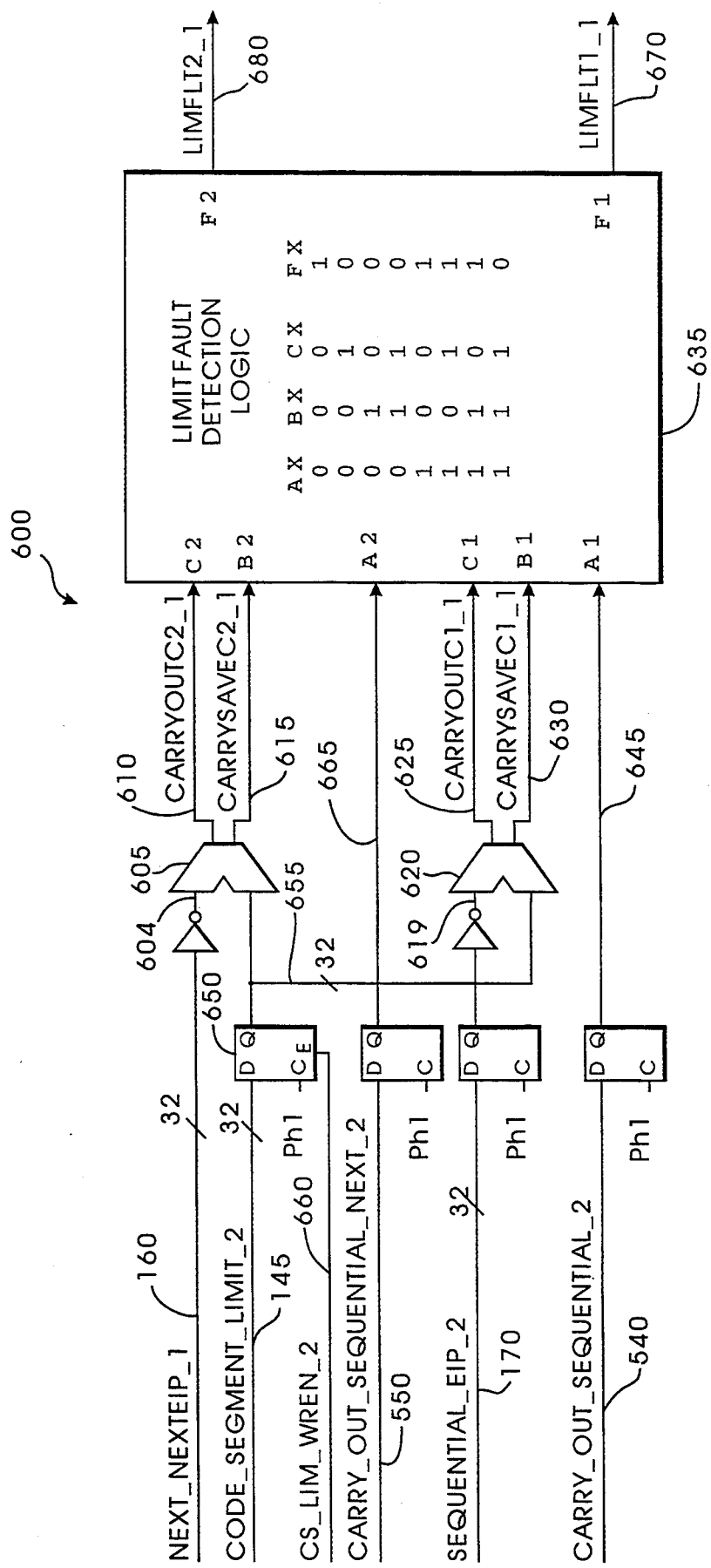
FIG. 6 shows the CS Limit Checking Logic.

FIG. 6 illustrates the CS Limit Check Logic 600. The CS limit 145 is loaded into latch 650 via enable CS_LIM_WREN_2 660 by AP. AP does this whenever it loads a new code segment limit into its hidden descriptor cache. This occurs as part of a transfer of control instruction when both AP and DEU are synchronized. CS_LIM_WREN_2 660 is also asserted and latch 650 loaded on an abort when the prior CS Limit is retrieved from the appropriate re-assignable segment register.

Signal 619 (the phase 1 and complemented version of SEQUENTIAL_EIP 170) and signal 655 (the phase 1 version of CODE_SEGMENT_LIMIT_2 145 output by latch 650) are inputs to comparator 620. Comparator 620 conceptually consists of a three input carry-save adder followed by a carry-propagate circuit. (There are no sum outputs from comparator 620.) The internal architecture of a preferred embodiment of comparator 620 is discussed infra. Two of the three inputs to the carry-save adder are the inputs shown in the drawing, signal 619 and signal 655. The third input is hardwired to the value 2. Signal CARRYSAVEC1_1 630 is the carry output from the most significant bit of the carry-save adder. It is not routed to the carry-propagate circuit. CARRYOUTC1_1 625 is the carry output from the most significant bit of the carry-propagate circuit.

The two carries, 625 and 630, are routed, along with the wrap-carry 645, to the lower inputs of Limit Fault Detection Logic 635. Wrap-carry 645 is the phase 1 version of CARRY_OUT_SEQUENTIAL_2 540. Logic 635 carries out the combinational function specified on its face in the drawing, generating LIMFLT1_1 670. This function is equivalently expressed in expanded sum-of-products form by:

$$F(A,B,C) = \Sigma 0, 4, 5, 6.$$

The technology or technique used to carry out this combinational function is not critical to the CS limit check function. By implementing comparator 620 using a carry-save adder followed by a carry-propagate circuit, the wrap-carry with "double-carry" case (corresponding to minterm $m_7$, ABC=111) can be detected easily.

This discussion has so far described the limit checking only for the SEQUENTIAL_EIP. SEQUENTIAL_NEXTEIP, in the form of NEXT_NEXTEIP_1, is checked using the same technique. Signal 604 (the complemented version of NEXT_NEXTEIP_1 160) and signal 655 (the phase 1 version of CODE_SEGMENT_LIMIT_2 output by latch 650) are inputs to comparator 605. Comparator 605 is identical to comparator 620. Signal CARRYSAVEC2_1 615 is the carry output from the most significant bit of the carry-save adder. CARRYOUTC2_1 610 is the carry output from the most significant bit of the carry-propagate circuit. The two carries, 615 and 610, are routed, along with the wrap-carry 665, to the upper inputs of Limit Fault Detection Logic 635. Wrap-carry 665 is the phase 1 version of CARRY_OUT_SEQUENTIAL_NEXT_2 550. Logic 635 carries out the combinational function specified on its face in the drawing, generating LIMFLT2_1 680. The expanded sum-of-products form for this function was given supra. The limit checking for SEQUENTIAL_EIP and SEQUENTIAL_NEXTEIP is carried out in parallel.

The limit faults 670 and 680 are used to notify DEC that the operations have completed their EIP calculations normally (no fault) or abnormally (limit fault). A CS limit fault is prioritized by DEC against the several types of faults reported by AP to DEC. These faults are prioritized as follows:

(1) instruction debug breakpoint;
(2) non-maskable interrupt;
(3) interrupt;
(4) CS limit fault; and
(5) all other faults.

In the event that the Dual EIP processed two operations, the first one faulting is given precedence.

LIMIT FAULT H/STORY RAM

Figure 7:
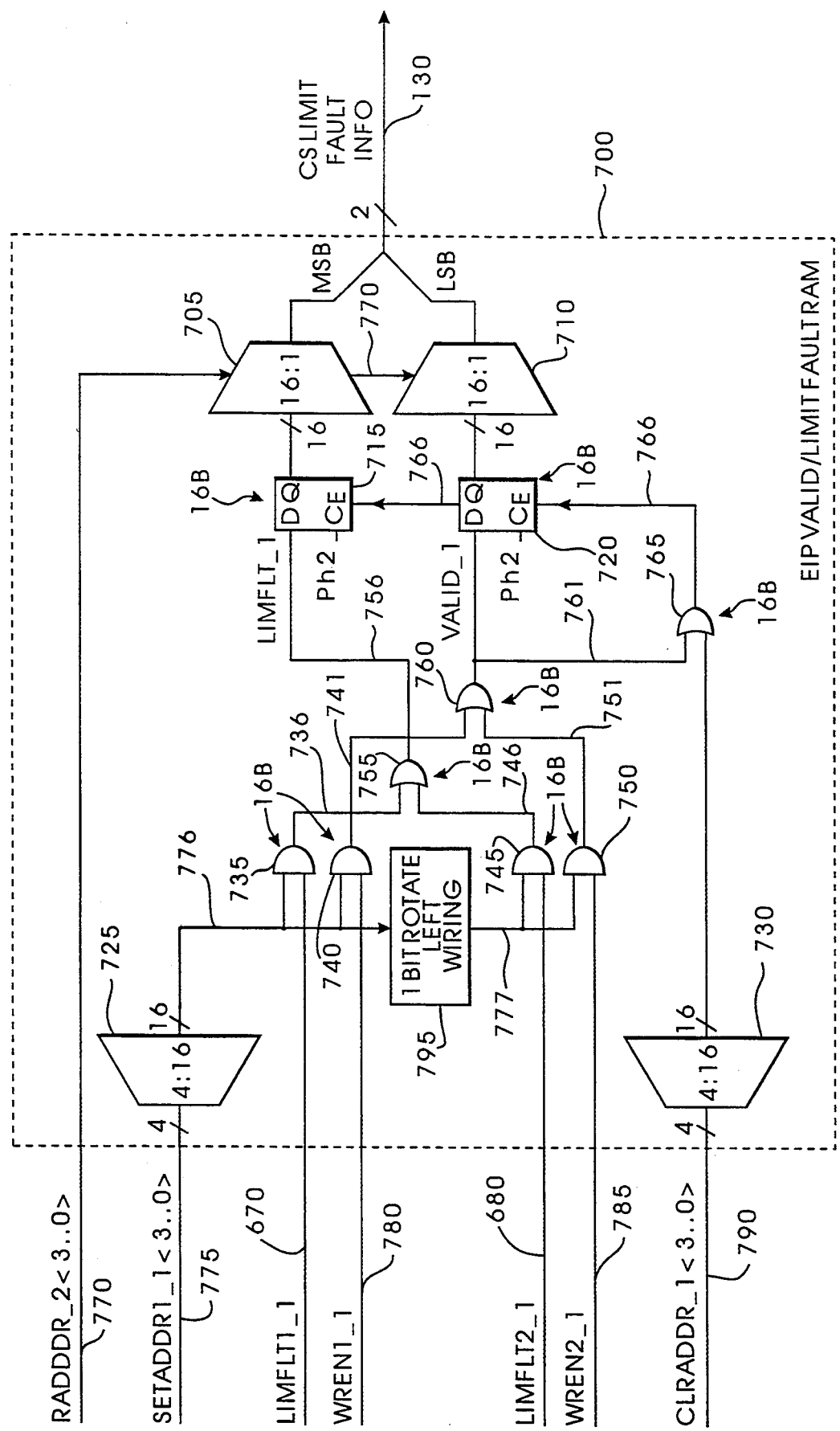
FIG. 7 illustrates the EIP Valid/Limit-Fault RAM that maintains a Limit Fault History.

FIG. 7 portrays the Limit Fault History block 700, also known as the EIP VALID RAM (EIPVRAM). LIMFLT1 670 and LIMFLT2 680 are stored in a RAM like structure (latches 715) together with a bit (latches indicating that the limit fault is valid.

When a p-op is issued, it is given a unique tag address. The valid bit in the EIPVRAM 700, corresponding to the tag address is cleared upon the p-op's issue and subsequent receipt by P-Op Queue 800. This (binary encoded) tag address is conveyed via CLRADDR 790 to the 4-to-16 decoder 730. CLRADDR 790 is provided to the EIPVRAM by Dual EIP Control 900. The active 1-out-of-16 (unencoded) address will enable a latch pair 715 and 720, corresponding to the address. The enable 766 is output from OR gate 765. It will be seen that the latch pair addressed by CLRADDR 790 will not have their D-inputs set, and thus will be cleared.

Each LIMFLT is written at the address specified by the tag of the associated operation. Since LIMFLT1 is a function of the next EIP, which as discussed supra is computed from the current EIP and the ilen of the operation executed, the associated tag address is already available when LIMFLT1 is calculated. Likewise, LIMFLT2's tag address is available when LIMFLT2 is calculated. DEU can thus write the LIMFLT value(s) into the EIPVRAM 700 and set the corresponding valid bit(s) in Ph2 following every non-null cycle. (LIMFLT2 is only meaningful and, therefore only written into the EIPVRAM, if two operations were executed in the previous cycle.)

SETADDR1 775 is equal to the tag of the first (and possibly only) operation executed in the previous cycle. SETADDR1 775 is provided to the EIPVRAM by Dual EIP Control 900. This tag address is coupled to 4-to-16 decoder 725. The resulting 1-out-of-16 (unencoded) address 776 is routed to AND gates 735 and 740, as well as the Rotate 1-bit Wiring block 795. Block 795 is used to provide the next sequential tag address 777. Block 785 uses a similar technique to that described supra for block 420 of the EIP History RAM 400, but it performs a one bit left rotate instead of a rig rotate. Address 777 is thus one greater, modulo 16, than address 776. LIMFLT1 670 and LIMFLT2 680, and WREN1 780 and WREN2 785, are all single-bit signals that are fanned-out to drive the four 16-bit gates 735, 740, 745, and 750.

If LIMFLT1 is active, AND gate 735 will activate the one bit out-of-16 in signal 736 that corresponds to SETADDR1. Likewise, AND gate 745 will generate a similar unencoded signal 746 associated with LIMFLT2. OR gate 755 combines signals 736 and 746 to create bit-vector LIMFLT 756. Note that a maximum of two-bits, corresponding to the "adjacent" (modulo 16 addressing) unencoded tag addresses for the two processed operations, may be active in LIMFLT 756.

Similarly, if write enable WREN1 780 is active, AND gate 740 will generate unencoded write signal 741. If two operations were processed, WREN2 is also active, and AND gate 750 will generate unencoded write signal 751. OR gate 760 combines signals 741 and 751 to create bit-vector VALID 761. Note that a maximum of two-bits, corresponding to the "adjacent" unencoded tag addresses for the two processed operations, may be active in VALID 761.

VALID 761 drives the second input of OR gate 765, which generates enable 766 discussed supra. Since SETADDR1 775 is equal to the tag of the operation being executed, while CLRADDR 790 is equal to the tag of the operation being issued, the two addresses are unequal. Because VALID 761 is generated based on SETADDR1, the bit positions in VALID 761 corresponding to CLRADDR will be clear. Thus, as asserted supra, the latches associated with CLRADDR will be cleared. Note that a maximum of three-bits may be active in the enable bit-vector 766. Of the active bits in enable 766, at most two correspond to the "adjacent" unencoded tag addresses for the two processed operations.

Further note that due to the rotate function, outputs 736 and 746 will never both be active in the same bit position. The same is true for outputs 741 and 751. WREN1 780 and WREN2 785 are the phase 1 versions of the write enables 465 and 475, respectively, used to write the EIP History RAM. They are generated by Dual EIP Control 900.

The valid bit 761 not only indicates that the limit fault value is meaningful, but it also indicates that the EIP value stored in the EIP History RAM is valid. Only when the valid bit is set, may AP use the limit fault information or the EIP value for the associated p-op. If the EIP is not ready for a particular p-op, the associated valid bit is clear. If AP needs to use an EIP value for which the valid bit is clear, AP can be stalled for the associated p-op. The stall will continue until the valid bit becomes set.

CS Limit Fault Information 130 is selected by encoded muxes 705 and 710 using address RADDR 770, supplied by AP. This address is the phase 2 version of the address corresponding to signal 415 used to read from the second port of the EIP History RAM 400. AP uses the CS Limit Fault information 130 from the Limit Fault History 700 to prioritize a limit fault against an instruction breakpoint fault.

LOW-LEVEL ARCHITECTURE OF THE DUAL EIP ADDER

Figure 8A:
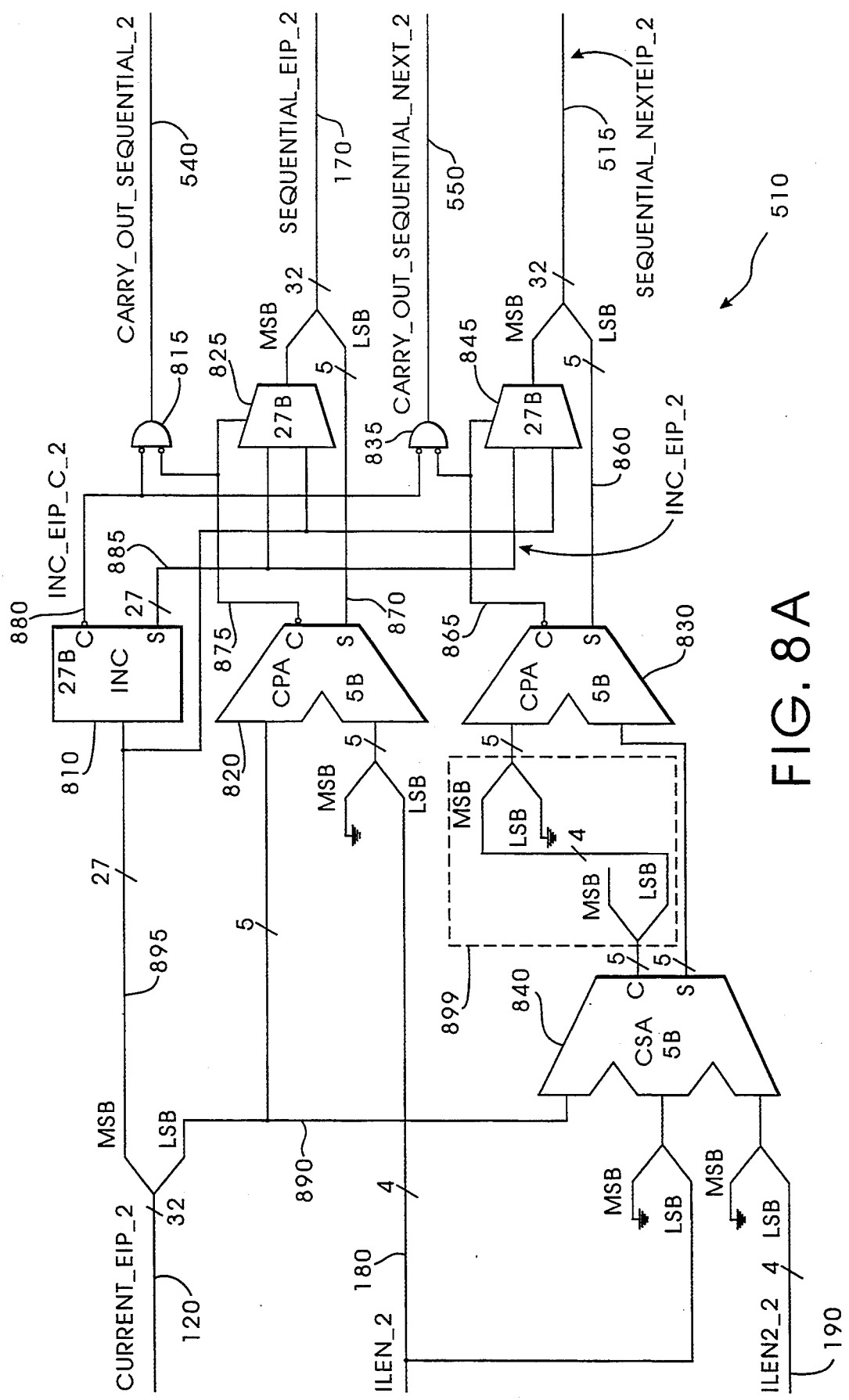
FIG. 8A is a schematic of the internal architecture of the adder used to perform the Dual EIP Advance.

FIG. 8A illustrates a preferred embodiment for adder 510, used in the Dual EIP Advance block 500. Adder 510 includes the 5-bit carry-save adder 840, the 5-bit carry-propagate adder 830, the 5-bit carrypropagate adder 820, the 27-bit incrementer 810, nor gates 815 and 835, and encoded muxes 825 and 845. Incrementer 810 takes CURRENT_EIP_2<31...5 >895 as input and generates INC_EIP_2<26 . . . 0>885 and INC_EIP_C 880 (carry) as output. INC_EIP_2 885 is always one greater than the CURRENT_EIP_2<31 . . . 5>895. There is no control input to incrementer 810.

Figure 8B:
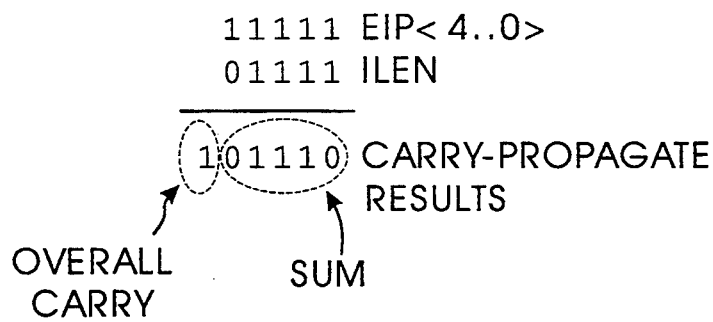
FIG. 8B and 8C illustrate an important combination of input operands for the adder of FIG. 8A.

Signal 870, corresponding to SEQUENTIAL_EIP<4 . . . 0>, is generated by 5-bit carry-propagate adder 820. A first input of adder 820 is signal 890, corresponding to CURRENT_EIP_2<4 . . . 0>. A second input of adder 820 has its least significant 4-bits coupled to ILEN_2 180. The most significant bit of the second input is hardwired to zero. It follows that the most significant bit alternatively could be implemented as a half-adder. FIG. 8B shows the carry-propagate results for the case where both operands are at their maximum values. This case demonstrates that an active carry-out 875 can result.

Carry-propagate adder 820 forms sum<0 . . . 2>and sum<4> as modulo-2 sums of the input operands and the carry-in at each bit. Sum bit<3> is selected from conditional-sums by carry-out<1>(the carry-out of bit<1>). Carry-out<0 . . . 1>and carry-out<4>are generated using the majority function of the input operands and the carry-in at each bit. Carry-out<2> is not implemented. Carry-out<3> is generated using a nested majority function written in terms of the input operands for the inputs at bits<3 . . . 2> and carry-out<1>. The specific logic chosen for adder 820 affects the performance of, but is not critical to, the overall function of the dual EIP adder.

Figure 8C:
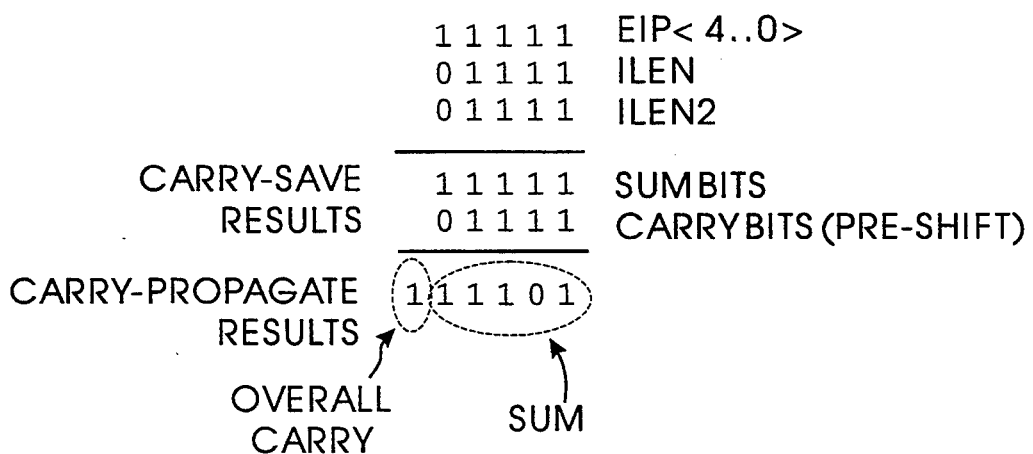

Signal 860, corresponding to SEQUENTIAL_NEXTEIP_2<4 . . . 0>, is generated by 5-bit carry-propagate adder 830, which is used to sum the carry and sum outputs of carry-save adder 840. As is well known in the art, the carry output vector is "left-shifted" with a zero carry-in before adding with the sum vector. This left-shift is illustrated in block 899. A first input of carry-save adder 840 is signal 890, corresponding to CURRENT_EIP_2<4 . . . 0>. The least significant 4-bits of the second input of adder 840 is ILEN_2 180. The most significant bit of the second input is hardwired to zero. The least significant 4-bits of the third input of adder 840 is ILEN2_2 190. The most significant bit of the third input is hardwired to zero. FIG. 8C shows the carry-save and carry-propagate results for the case where all three operands are at their maximum values. (The carry bits of the carry-save results are shown prior to shifting.) This case demonstrates that an active carry-out 865 can result. Adder 830 is identical to adder 820. The specific logic chosen for adder 830 is not critical to the overall function of the dual EIP adder.

Figure 8D:
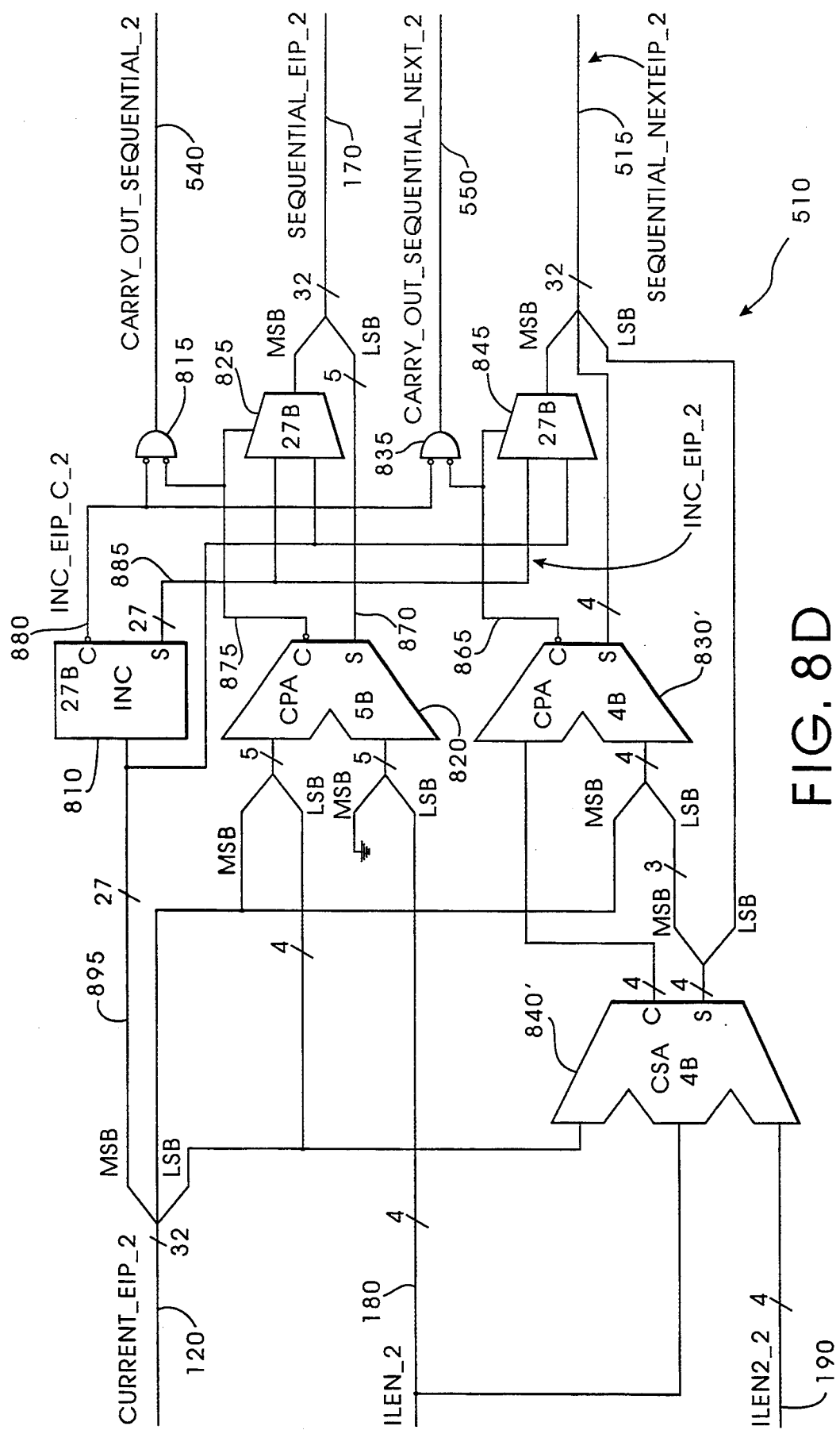
FIG. 8D illustrates an alternate embodiment to that of FIG. 8A that employs observations from FIG. 8C.

Other structures can be interchanged for adders 830 and 840 in FIG. 8A, based on observations of FIG. 8C. The sum output of the most significant bit of adder 840 in FIG. 8A will always follow the value of CURRENT_EIP_2<4>. The carry output for this same bit will always be zero and is not used. It follows that this bit need not be implemented at all, and that adder 840 alternatively could be implemented with only 4-bits. Similarly, since there is no active carry-in into the least significant bit of adder 830 in FIG. 8A, the least significant bit's sum output will always follow the least significant bit of the sum output of adder 840. Also, there will never be an active carry-out from this bit. It follows that this bit also need not be implemented at all, and that adder 830 alternatively could be implemented with only 4-bits. FIG. 8D illustrates 4-bit adders 830' and 840' performing the function of 5-bit adders 830 and 840 in FIG. 8A.

SEQUENTIAL_EIP_2<31 . . . 5> is selected by encoded mux 825 from either CURRENT_EIP_2<31 . . . 5> or INC_EIP_2<26 . . . 0> by the carry out 875 of carry-propagate adder 820. If a carry is generated, the incremented version is chosen. When no carry is generated, the non-incremented version is used. The output of NOR gate 815, CARRY_OUT_SEQUENTIAL_2 540, is likewise controlled by carry 875. NOR gate 815 is illustrated using the DeMorgan equivalent AND form. If the carry out 875 of carry-propagate adder 820 is active, CARRY_OUT_SEQUENTIAL_2 540 is equal to the complement of the carry out 880 of the incrementer 810. If signal 875 is not-active, CARRY_OUT_SEQUENTIAL_2 540 is clear.

Using the same topology, SEQUENTIAL_NEXTEIP_2<31 . . . 5> is selected by encoded mux 845 from either CURRENT_EIP_2<31 . . . 5> or INC_EIP_2<26 . . . 0> by the carry out 865 of carry-propagate adder 830. If a carry is generated, the incremented version is chosen. When no carry is generated, the non-incremented version is used. The output of NOR gate 835, CARRY_OUT_SEQUENTIAL_NEXT_2 550, is likewise controlled by carry 865. NOR gate 835 is illustrated using the DeMorgan equivalent AND form. If the carry out 865 of carry-propagate adder 830 is active, CARRY_OUT_SEQUENTIAL_NEXT_2 550 is equal to the complement of the carry out 880 of the incrementer 810. If signal 865 is not-active, CARRY_OUT_SEQUENTIAL_2 540 is clear.

Using the topology and logic indicated by FIG. 8A, significant area savings can be accomplished for adder 520 over the use of a general purpose 3-input N-bit adder designed for all possible N-bit operand combinations.

Figure 11:
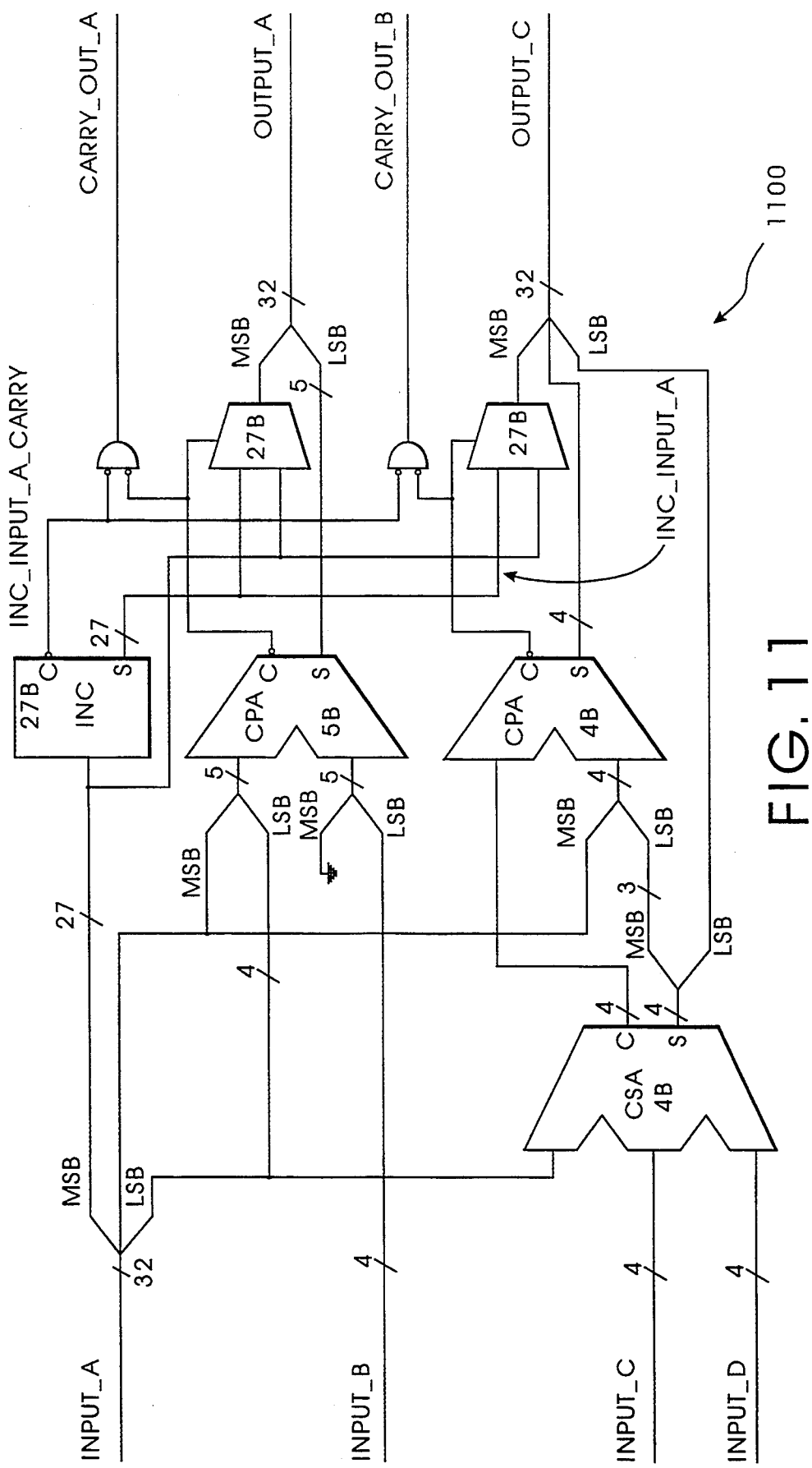
FIG. 11 illustrates a more general embodiment of the techniques used in FIGS. 8A and 8D.

The arithmetic circuits represented in FIG. 8A and 8D have more general application than that of sequential instruction pointer updates. Furthermore, the circuits of FIG. 8A and 8D can be considered degenerate cases of a more general approach illustrated in FIG. 11. FIG. 11 illustrates an adder 1100 that has four independent inputs. Only when Input_B and Input_C are tied common does the circuit degenerate to that of FIG. 8D. Clearly, a four independent input version of the circuit in FIG. 8A is likewise possible.

LOW-LEVEL ARCHITECTURE OF THE INCREMENTER

Figure 10A:
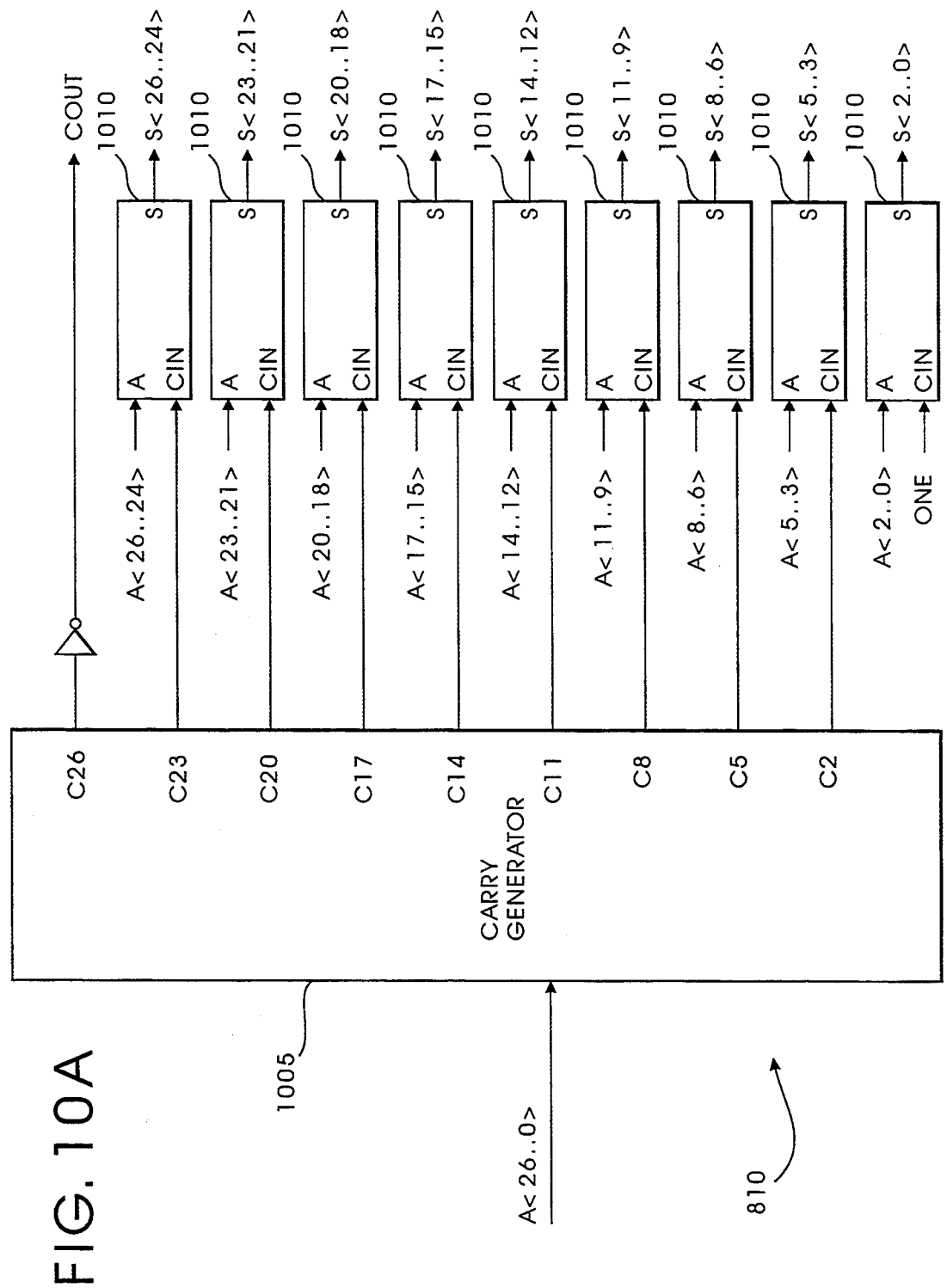
FIG. 10A diagrams the incrementer used in the Dual EIP Advance adder of FIGS. 8A and 8D.

FIG. 10A illustrates incrementer 810. The 27-bit incrementer 810 has nine incrementer groups 1010 of 3-bits each and a carry generator 1005 for generating the group carries (every third carry). The group carries are given by:

$$C_G = \prod_{i=0}^{G} A<i>$$

Where in the illustrated embodiment, G={2, 5, 8, 11, 14, 17, 20, 23, 26}. As an example, the carry-out that drives the carry-in of the second incrementer group is given by $C_2 = A<0> \cdot A<1> \cdot A<2>$. Other embodiments could use other than 3 bits in each group, and the specific group carries implemented would vary accordingly. The exact logic used to generate the carries is not critical to the function of the dual EIP adder. Given the above equation, the ability to generate the carries is within the background of one skilled in the art. In the preferred embodiment, there is a maximum of five gate delays between the inputs and any of the carry-outs.

Figure 10B:
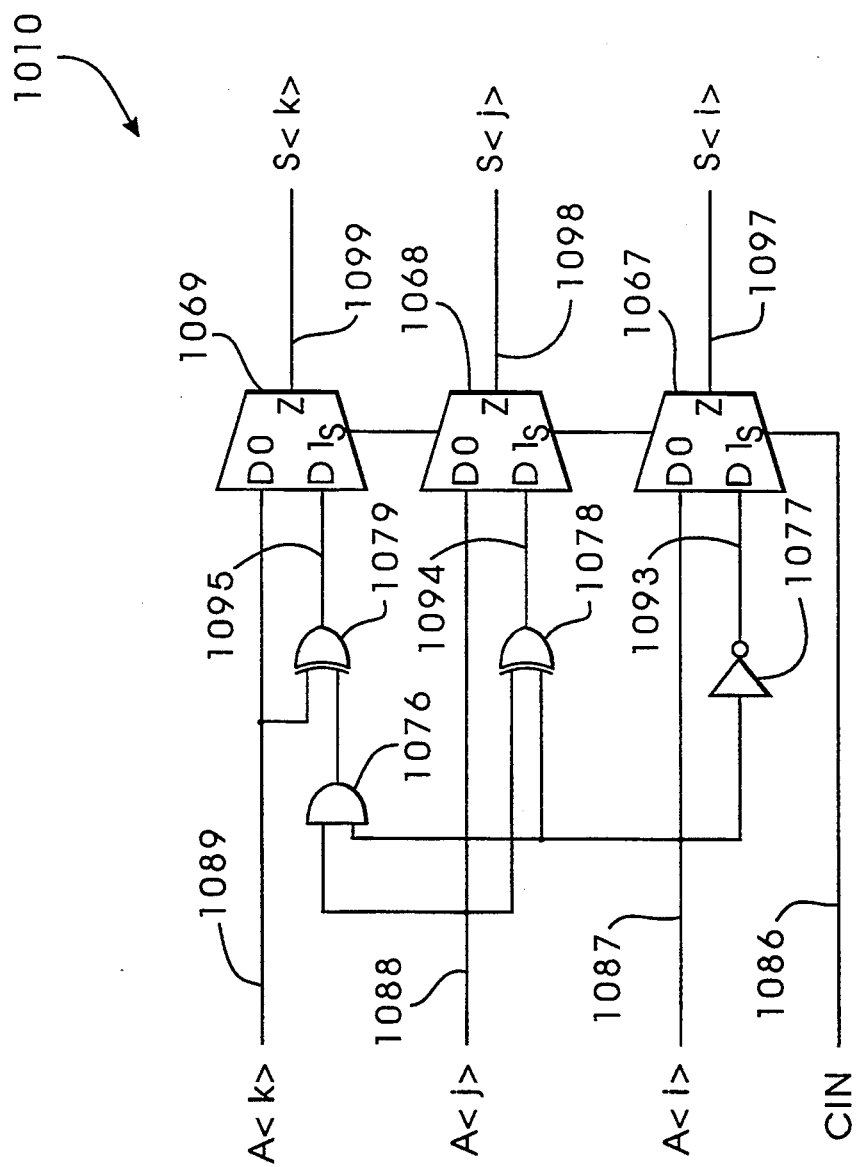
FIG. 10B is a schematic of the incrementer groups used in the incrementer of FIG. 10A.

FIG. 10B is a schematic of each of the incrementer groups 1010. Each output (1097, 1098, and 1099) of the 3-bit incrementer groups is selected from conditional-sums by the carry-in 1086 to the group. The logic for the conditional-sums and the logic for the carry-tree are minimized based on the use of a single input operand. When the carry-in 1086 is clear, the inputs (A<i> 1087, A<j> 1088, and A<k> 1089, in order of increasing significance) are selected (using muxes 1067, 1068, and 1069, respectively) to become the outputs (1097, 1098, and 1099, respectively). When the carry-in 1086 is set, the outputs of gates 1077, 1078, and 1079 are selected to become the outputs. With carry-in 1086 set, each output bit is the modulo two sum of the input and the effective (conditional) carry-in for that bit. When carry-in 1086 is set, the effective carry-ins are: one for bit<i>, A<i> for bit<j>, and A<i>·A<j> for bit<k>. Since the carry-in of the first group is ha to one, an optimized custom first group could be implemented by eliminating the muxes.

The specific logic chosen for incrementer 810 affects the performance of, but is not critical to, the overall function of the dual EIP adder. Incrementer 810 could also be implemented as a chain of half-adder cells, where the <i> cell is wired with a first input coupled to bit<i> of signal 895 and with the second input coupled to the carry-out of the <i-1> half-adder cell. The second input of the bit<O> cell would be set to one.

LOW-LEVEL ARCHITECTURE OF THE CS LIMIT CHECK COMPARATORS

A preferred embodiment for comparator 620 is shown in FIG. 9A. The structure of comparator 605 is identical to that of comparator 620. Comparator 620 comprises a custom carry-save adder 990 followed by a carry-propagation circuit 980. Sum outputs from the carry-propagation circuit are not required and are not implemented. Left-shill wiring 970 is similar to left-shift wiring 899 of FIG. 8A. However in wiring 970, the MSB from adder 990's carry output vector is used as CARRYSAVEC1_1 630. The overall carry output of carry-propagation circuit 980 is CARRYOUTC1_1 625. The physical inputs to adder 990 are signal 619, corresponding to !SEQUENTIAL_EIP, and signal 655, corresponding to the CS Limit. A virtual third input, corresponding to the value 2, is discussed next.

Custom carry-save adder 990 is shown in FIG. 9B. The adder consists of conventional two-input halfadder bit-slices (tiles) 910 for bit <0> and bits <31 ... 2> and a special carry-save-adder bit-slice (tile) 920 for bit<1>. To minimize area penalties due to wiring, it further is preferable for the physical placement of the adder bit-slices (tiles) to correspond directly to the functional bit ordering just described. The special bit-slice is designed to implement a combinational function corresponding to a carry-save adder having a virtual third input always having a logic one value. This third input thus corresponds to the hardwired value 2 in the conceptual description of comparators 605 and 620, described supra. FIG. 9C is the truth table for the combinational function of bit-slice 920. FIG. 9D shows the combinational function as implemented using logic gates. The sum output S<i> of the special carry-save bit-slice is the XNOR 930 of the two real inputs A<i> and B<i>. That is:

$$S<i> = \overline{A<i> \oplus B<i>}$$

The carry output C<i> of the special carry-save bit-slice is the OR 940 of the two real inputs A<i> and B<i>. That is:

$$C<i> = A<i> + B<i>.$$

(In FIG. 9B, i=1.) Compared to the conceptual first embodiment described for comparator 620, which uses all 3-input bit-slices for the carry-save adder, the preferred embodiment is more efficient in its use of area.

Carry-propagate circuit 980 employs full carry-look-ahead in the preferred embodiment. The specific logic chosen for carry-propagate circuit 980 affects the performance of, but is not critical to, the overall function of the CS limit check comparators.

Other structures can be interchanged for adder 990 and carry-propagate circuit 980. Due to the "left-shift," the carry-out of bit<0> of carry-propagate circuit 980 is always zero. Thus the current bit<O> need not be implemented, and carry-propagate circuit 980 need only be N bits in width, as opposed to the N+1 bits illustrated. It also follows that the input to bit<O> of the carry-propagate circuit 980 cannot affect the carry output 610. Thus the sum output of bit<O> of adder 990 is superfluous, and therefore need not be implemented.

Figure 9E:
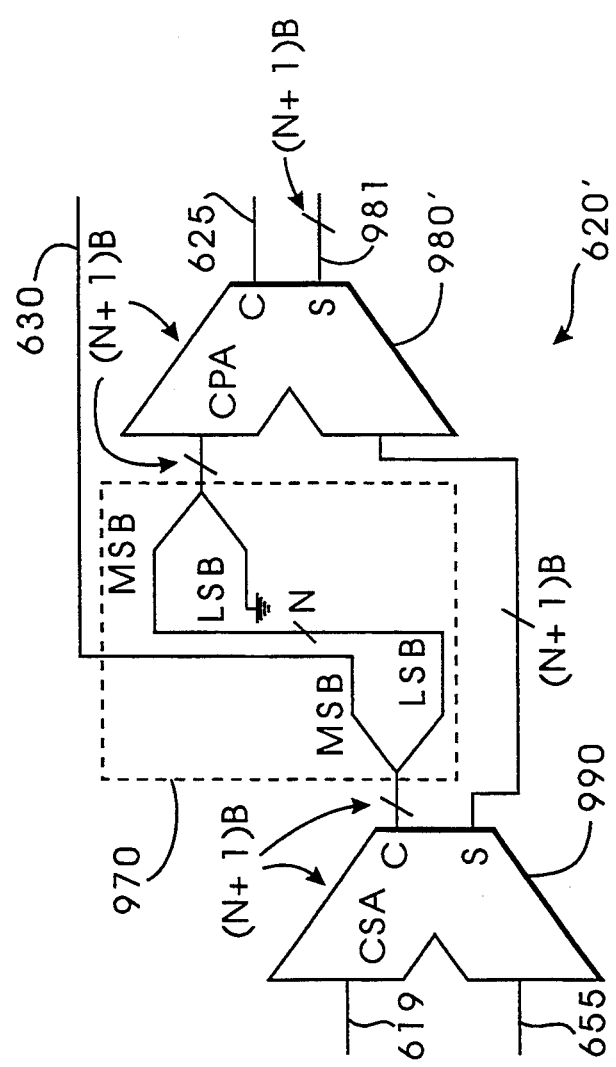
FIG. 9E is a general purpose adder for three inputs, one of which is a constant.

While the forgoing description has been directed to a use that requires a constant equal to 2, the virtual input technique has broader application. A dedicated three-input adder or comparator for any constant may be implemented by using a custom CSA followed by a CPA (for an adder) or a carry-propagate circuit (for a comparator). FIG. 9A, discussed supra, would also apply to such comparators. FIG. 9E illustrates a three-input adder 620', where one input is a predetermined, but otherwise arbitrary, constant. (Only the variable inputs are explicitly drawn in FIG. 9E, the constant input is implicit.) Adder 620' is the comparator 620 of FIG. 9A, but further including sum output 981. The CSA of such an adder/comparator is built using the special virtual third input cells 920 for bit positions corresponding to bits of the constant that are equal to one. The bit positions corresponding to bits of the constant that are equal to zero use conventional half-adder cells 910. As is known in the art, the carry-vector output by the CSA is shifted left prior to adding with the sum vector in the CPA or carry-propagate circuit. Also as is known in the art, the most significant carry-outs of both the CSA and the CPA, or carry-propagate circuit, generally must be accounted for. Dedicated three-input adders using this approach are substantially smaller than a general purpose three-input adder, particularly for constants having only a few bits equal to one.

CONCLUSION

Although the present invention has been described using particular illustrative embodiments, it will be understood that many variations in construction, arrangement and use are possible within the scope of the invention. For example, the number of streams involved in speculative execution may vary, the number of outstanding operations may differ, or speculative execution may not be used at all. The number of operations for which the advance EIP is calculated and for which CS limit checking is performed may be more than the two illustrated. Thus the name "Dual EIP Unit" is merely illustrative, and should not be construed as limiting the invention. Several select functions were disclosed using muxes. Equivalent techniques such as three-state bussing or and/or gating, may be employed instead. RAM details, such as the number of RAM ports, the width of an entry, or the type of storage element might be varied. Also, functionally equivalent adder combinations may be employed for performing many aspects of the disclosure. The present invention is thus to be considered as including all possible modifications and variations encompassed within the scope of the appended claims.

We claim:

1. A binary arithmetic circuit comprising:
   (a) inputs including
      a first binary variable of a first width, and
      a second binary variable of a second width, wherein said first width is greater than said second width, such that said first binary variable has most significant bits of greater significance than said second binary variable and least significant bits of width equal to said second width;
   (b) an incrementer having
      a sum output,
      a carry output, and
      an input coupled to said most significant bits of said first binary variable;
   (c) an adder having
      a sum output,
      a carry output,
      a first input coupled to said least significant bits of said first binary variable, and
      a second input coupled to said second binary variable; and
   (d) carry-output logic having a carry output, wherein said carry output is active only when said incrementer's carry output and said adder's carry output are both active.

2. The binary arithmetic circuit of claim 1:
   (a) wherein said inputs further include a third binary variable of a third width; and
   (b) wherein said adder has a third input coupled to said third binary variable.

3. The binary arithmetic circuit of claim 2, wherein said second width and third width are equal.

4. The binary arithmetic circuit of claim 1, further including:
   (a) selection logic having
      a first signal input coupled to said most significant bits of said first binary variable,
      a second signal input coupled to the output of said incrementer, and
      a control input coupled to said adder's carry output,
      wherein said incrementer's output is selected when said adder carry output is active and said most significant bits of said first binary variable are selected when said adder carry output is inactive; and
   (b) a sum output, wherein the most significant bits of said sum output are said selection logic's output and the least significant bits of said sum output are said adder's sum output.

5. The binary arithmetic circuit of claim 4:
   (a) wherein said inputs further include a third binary variable of a third width; and
   (b) wherein said adder has a third input coupled to said third binary variable.

6. The binary arithmetic circuit of claim 5, wherein said second and third width are equal.

7. The binary arithmetic circuit of claim 2, further including:
   (a) a second adder having
      a sum output,
      a carry output,
      a first input coupled to said least significant bits of said first binary variable, and
      a second input coupled to said second binary variable; and
   (b) second carry-output logic having a second carry output, wherein said second carry output is active only when said incrementer's carry output and said second adder's carry output are both active.

8. The binary arithmetic circuit of claim 7, wherein said second and third width are equal.

9. The binary arithmetic circuit of claim 5, further including:
   (a) a second adder having a sum output,
a carry output,
a first input coupled to said least significant bits of said first binary variable, and
a second input coupled to said second binary variable;

(b) second carry-output logic having a second carry output, wherein said second carry output is active only when said incrementer's carry output and said second adder's carry output are both active;

(c) second selection logic having
a first signal coupled to said most significant bits of said first binary variable,
a second signal input coupled to the output of said incrementer, and
a control input coupled to said second adder's carry output,
wherein said incrementer's output is selected when said second adder carry output is active and said most significant bits of said first binary variable are selected when said second carry output is inactive; and (d) a second sum output, wherein the most significant bits of said second sum output are said second selection logic's output and the least significant bits of said second sum input are said second adder's output.

10. The binary arithmetic circuit of claim 9, wherein said second and third width are equal.

* * * * *